US012325828B2

(12) United States Patent
Quanci et al.

(10) Patent No.: US 12,325,828 B2
(45) Date of Patent: Jun. 10, 2025

(54) EXHAUST FLOW MODIFIER, DUCT INTERSECTION INCORPORATING THE SAME, AND METHODS THEREFOR

(71) Applicant: SUNCOKE TECHNOLOGY AND DEVELOPMENT LLC, Lisle, IL (US)

(72) Inventors: John Francis Quanci, Haddonfield, NJ (US); Rajat Kapoor, Naperville, IL (US); Chun Wai Choi, Chicago, IL (US); Ung-Kyung Chun, Chicago, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 17/191,119

(22) Filed: Mar. 3, 2021

(65) Prior Publication Data

US 2021/0363427 A1 Nov. 25, 2021

Related U.S. Application Data

(62) Division of application No. 15/281,891, filed on Sep. 30, 2016, now Pat. No. 10,975,309, which is a
(Continued)

(51) Int. Cl.
*F17D 1/02* (2006.01)
*C10B 27/06* (2006.01)
(Continued)

(52) U.S. Cl.
CPC ............. *C10B 27/06* (2013.01); *F01K 3/185* (2013.01); *F17D 1/02* (2013.01); *H02K 7/1823* (2013.01);
(Continued)

(58) Field of Classification Search
CPC ... F17D 1/02; C10B 21/18; Y10T 137/87676; Y10T 137/87652; Y10T 137/85938
See application file for complete search history.

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

U.S. Appl. No. 17/155,818, filed Jan. 22, 2021, Mar. 3, 2021, Quanci et al.
(Continued)

*Primary Examiner* — Craig M Schneider
*Assistant Examiner* — Christopher D Ballman
(74) *Attorney, Agent, or Firm* — Perkins Coie LLP; Vijay S. Kumar

(57) ABSTRACT

A duct intersection comprising a first duct portion and a second duct portion extending laterally from a side of the first duct portion. At least one flow modifier is mounted inside one of the first and second duct portions. The flow modifier is a contoured duct liner and/or the flow modifier includes at least one turning vane. The duct intersection may also include a transition portion extending between the first and second duct portions, wherein the transition portion has a length extending along a side of the first duct portion and a depth extending away from the side of the first duct portion, wherein the length is greater than a diameter of the second duct portion.

19 Claims, 15 Drawing Sheets

Related U.S. Application Data division of application No. 13/730,673, filed on Dec. 28, 2012, now Pat. No. 9,476,547.

(51) Int. Cl.
*F01K 3/18* (2006.01)
*H02K 7/18* (2006.01)
*C10B 21/18* (2006.01)

(52) U.S. Cl.
CPC ......... *C10B 21/18* (2013.01); *Y10T 137/0318* (2015.04); *Y10T 137/85938* (2015.04); *Y10T 137/87652* (2015.04); *Y10T 137/87676* (2015.04)

(56) References Cited

U.S. PATENT DOCUMENTS

| | | |
|---|---|---|
| 705,926 A | 7/1902 | Hemingway |
| 760,372 A | 5/1904 | Beam |
| 845,719 A | 2/1907 | Schniewind |
| 875,989 A | 1/1908 | Garner |
| 976,580 A | 7/1909 | Krause |
| 1,140,798 A | 5/1915 | Carpenter |
| 1,378,782 A | 5/1921 | Floyd |
| 1,424,777 A | 8/1922 | Schondeling |
| 1,429,346 A | 9/1922 | Horn |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,343,034 A | 2/1944 | Weber |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,765,266 A | 10/1956 | Throop et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,010,882 A | 11/1961 | Barclay et al. |
| 3,015,893 A | 1/1962 | McCreary |
| 3,026,715 A | 3/1962 | Briggs |
| 3,033,764 A | 5/1962 | Hannes |
| 3,085,582 A | 4/1963 | Slosman |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson, Jr. |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,453,839 A | 7/1969 | Sabin |
| 3,462,345 A | 8/1969 | Kernan |
| 3,462,346 A | 8/1969 | Kernan et al. |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,897,313 A | 7/1975 | Ibaragi et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A * | 3/1978 | Gainer ................... C10B 33/10 202/262 |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |

(56) References Cited

U.S. PATENT DOCUMENTS

| | | |
|---|---|---|
| 4,176,013 A | 11/1979 | Garthus et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,199,008 A * | 4/1980 | Bright .................... F16J 15/14 |
| | | 126/307 R |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A * | 10/1980 | Rueckl ................ C04B 35/6316 |
| | | 501/129 |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A * | 10/1981 | Offermann .............. C10B 27/06 |
| | | 202/242 |
| 4,298,497 A | 11/1981 | Colombo |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,441,892 A | 4/1984 | Schuster |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,529,407 A | 7/1985 | Johnston et al. |
| 4,564,420 A | 1/1986 | Spindeler et al. |
| 4,568,424 A | 2/1986 | Bauer |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,013,408 A | 5/1991 | Asai et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,745,969 A | 5/1998 | Yamada et al. |
| 5,752,548 A | 5/1998 | Matsumoto et al. |
| 5,752,993 A | 5/1998 | Eatough et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,022,112 A | 2/2000 | Isler et al. |
| 6,059,932 A | 5/2000 | Sturgulewski |
| 6,126,910 A | 10/2000 | Wilhelm et al. |
| 6,139,692 A | 10/2000 | Tamura et al. |
| 6,152,668 A | 11/2000 | Knoch |

(56) References Cited

U.S. PATENT DOCUMENTS

| | | |
|---|---|---|
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,244,457 B1 * | 6/2001 | Piotrowski .............. F16K 13/10 220/228 |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,311,777 B2 | 11/2012 | Suguira et al. |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 11,008,517 B2 | 5/2021 | Chun et al. |
| 11,008,518 B2 | 5/2021 | Quanci et al. |
| 11,021,655 B2 | 6/2021 | Quanci et al. |
| 11,053,444 B2 | 7/2021 | Quanci et al. |
| 11,098,252 B2 | 8/2021 | Quanci et al. |
| 11,117,087 B2 | 9/2021 | Quanci |
| 11,142,699 B2 | 10/2021 | West et al. |
| 12,215,289 B2 | 2/2025 | Quanci et al. |
| 2002/0170605 A1 | 11/2002 | Shiraishi et al. |
| 2003/0014954 A1 | 1/2003 | Ronning et al. |
| 2003/0015809 A1 | 1/2003 | Carsor |
| 2003/0057083 A1 | 3/2003 | Eatough et al. |
| 2004/0016377 A1 | 1/2004 | Johnson et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0181717 A1 | 8/2007 | Fuller |
| 2007/0251198 A1 | 11/2007 | Witter |
| 2008/0028935 A1 | 2/2008 | Andersson |
| 2008/0116052 A1 | 5/2008 | Eatough et al. |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0159247 A1 | 6/2010 | Kaya et al. |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |

(56) References Cited

U.S. PATENT DOCUMENTS

| | | |
|---|---|---|
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0100273 A1 | 5/2011 | Ptacek |
| 2011/0120852 A1 | 5/2011 | Kim |
| 2011/0144406 A1 | 6/2011 | Masatsugu et al. |
| 2011/0156902 A1 | 6/2011 | Wang et al. |
| 2011/0162265 A1 | 7/2011 | Krumpp et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0272508 A1 | 11/2011 | Krebs et al. |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0195815 A1 | 8/2012 | Moore et al. |
| 2012/0210635 A1 | 8/2012 | Edwards |
| 2012/0228115 A1 | 9/2012 | Westbrook |
| 2012/0247939 A1 | 10/2012 | Kim et al. |
| 2012/0285080 A1 | 11/2012 | Despen et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0156584 A1 | 6/2014 | Motukuri et al. |
| 2014/0182683 A1 | 7/2014 | Quanci et al. |
| 2014/0208997 A1 | 7/2014 | Alferyev et al. |
| 2014/0224123 A1 | 8/2014 | Walters |
| 2014/0245803 A1 | 9/2014 | Forsythe et al. |
| 2014/0262726 A1 | 9/2014 | West et al. |
| 2015/0041304 A1 | 2/2015 | Kiim et al. |
| 2015/0075962 A1 | 3/2015 | Shimoyama et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0176095 A1 | 6/2015 | Connors et al. |
| 2015/0219530 A1 | 8/2015 | Li et al. |
| 2015/0226499 A1 | 8/2015 | Mikkelsen |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0319198 A1 | 11/2016 | Quanci et al. |
| 2016/0370082 A1 | 12/2016 | Olivo |
| 2016/0377430 A1 | 12/2016 | Kalagnanam et al. |
| 2017/0173519 A1 | 6/2017 | Naito |
| 2017/0182447 A1 | 6/2017 | Sappok et al. |
| 2017/0183569 A1 | 6/2017 | Quanci et al. |
| 2017/0218274 A1 | 8/2017 | Yu et al. |
| 2017/0226425 A1 | 8/2017 | Kim et al. |
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0169503 A1 | 6/2019 | Chun et al. |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0206669 A1 | 7/2020 | Quanci et al. |
| 2020/0206683 A1 | 7/2020 | Quanci et al. |
| 2020/0208058 A1 | 7/2020 | Quanci et al. |
| 2020/0208059 A1 | 7/2020 | Quanci et al. |
| 2020/0208060 A1 | 7/2020 | Quanci et al. |
| 2020/0208062 A1 | 7/2020 | Quanci et al. |
| 2020/0208063 A1 | 7/2020 | Quanci et al. |
| 2020/0208833 A1 | 7/2020 | Quanci et al. |
| 2020/0231876 A1 | 7/2020 | Quanci et al. |
| 2020/0407641 A1 | 12/2020 | Quanci et al. |
| 2021/0024828 A1 | 1/2021 | Ball et al. |
| 2021/0032541 A1 | 2/2021 | Crum et al. |
| 2021/0040391 A1 | 2/2021 | Quanci et al. |
| 2021/0130697 A1 | 5/2021 | Quanci et al. |
| 2021/0163821 A1 | 6/2021 | Quanci et al. |
| 2021/0163822 A1 | 6/2021 | Quanci et al. |
| 2021/0163823 A1 | 6/2021 | Quanci et al. |
| 2021/0198579 A1 | 7/2021 | Quanci et al. |
| 2021/0261877 A1 | 8/2021 | Despen et al. |
| 2021/0340454 A1 | 11/2021 | Quanci et al. |
| 2021/0363426 A1 | 11/2021 | West et al. |
| 2021/0371752 A1 | 12/2021 | Quanci et al. |
| 2021/0388270 A1 | 12/2021 | Choi et al. |
| 2022/0056342 A1 | 2/2022 | Quanci et al. |
| 2022/0298423 A1 | 9/2022 | Quanci et al. |
| 2022/0325183 A1 | 10/2022 | Quanci et al. |
| 2022/0356410 A1 | 11/2022 | Quanci et al. |
| 2023/0012031 A1 | 1/2023 | Quanci et al. |
| 2023/0258326 A1 | 8/2023 | Quanci et al. |
| 2023/0330596 A1 | 10/2023 | Bumb et al. |
| 2023/0360511 A1 | 11/2023 | Quanci et al. |
| 2023/0416629 A1 | 12/2023 | Quanci et al. |
| 2024/0110103 A1 | 4/2024 | Quanci et al. |
| 2025/0027177 A1 | 1/2025 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101362971 A | 2/2009 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 101921643 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |

(56) References Cited

FOREIGN PATENT DOCUMENTS

| | | |
|---|---|---|
| CN | 202470353 U | 10/2012 |
| CN | 103399536 A | 11/2013 |
| CN | 103468289 A | 12/2013 |
| CN | 103468841 A | 12/2013 |
| CN | 103756699 A | 4/2014 |
| CN | 103913193 A | 7/2014 |
| CN | 203981700 U | 12/2014 |
| CN | 104498059 A | 4/2015 |
| CN | 105001914 A | 10/2015 |
| CN | 105137947 A | 12/2015 |
| CN | 105189704 A | 12/2015 |
| CN | 105264448 A | 1/2016 |
| CN | 105467949 A | 4/2016 |
| CN | 105842065 A | 8/2016 |
| CN | 106399607 A | 2/2017 |
| CN | 106661456 A | 5/2017 |
| CN | 106687564 A | 5/2017 |
| CN | 107022359 A | 8/2017 |
| CN | 107267183 A | 10/2017 |
| CN | 107445633 A | 12/2017 |
| CN | 108219807 A | 6/2018 |
| CN | 110141947 A | 8/2019 |
| CN | 100500619 C | 6/2020 |
| CN | 111778048 A | 10/2020 |
| CN | 113322085 A | 8/2021 |
| CN | 113462415 A | 10/2021 |
| CN | 114517099 A | 5/2022 |
| CN | 101921643 B | 12/2022 |
| CN | 116606664 A | 8/2023 |
| DE | 201729 C | 9/1908 |
| DE | 212176 | 7/1909 |
| DE | 1212037 B | 3/1966 |
| DE | 2212544 A | 1/1973 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102004062936 A1 | 7/2006 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EA | 010510 B1 | 10/2008 |
| EP | 0126399 A1 | 11/1984 |
| EP | 0208490 A1 | 1/1987 |
| EP | 0418801 A1 | 3/1991 |
| EP | 0433498 A1 | 6/1991 |
| EP | 0903393 A2 | 3/1999 |
| EP | 1538503 A1 | 6/2005 |
| EP | 1860034 A1 | 11/2007 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 783720 A | 9/1957 |
| GB | 871094 | 6/1961 |
| GB | 923205 A | 5/1963 |
| GB | 2000193 A | 1/1979 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | H0776713 A | 3/1995 |
| JP | 07188668 | 7/1995 |
| JP | 07216357 | 8/1995 |
| JP | H07204432 | 8/1995 |
| JP | H0843314 A | 2/1996 |
| JP | H08104875 A | 4/1996 |
| JP | 08127778 | 5/1996 |
| JP | H08218071 A | 8/1996 |
| JP | H09310074 A | 12/1997 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001187887 A | 7/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003041618 A | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2006257252 A | 9/2006 |
| JP | 2007063420 A | 3/2007 |
| JP | 3924064 B2 | 6/2007 |
| JP | 2007169484 A | 7/2007 |
| JP | 2007231326 A | 9/2007 |
| JP | 4101226 B2 | 6/2008 |
| JP | 2008231278 A | 10/2008 |
| JP | 2009001640 A | 1/2009 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2009209286 A | 9/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012072389 A | 4/2012 |

(56) References Cited

FOREIGN PATENT DOCUMENTS

| | | |
|---|---|---|
| JP | 2012102302 | 5/2012 |
| JP | 2012102325 A | 5/2012 |
| JP | 2013006957 A | 1/2013 |
| JP | 2013510910 | 3/2013 |
| JP | 2013189322 A | 9/2013 |
| JP | 2014009284 A | 1/2014 |
| JP | 2014040502 A | 3/2014 |
| JP | 2015094091 A | 5/2015 |
| JP | 2015199791 A | 11/2015 |
| JP | 2016169897 A | 9/2016 |
| JP | 2020007472 A | 1/2020 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030011016 A | 2/2003 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20140076155 A | 6/2014 |
| KR | 20150011084 A | 1/2015 |
| KR | 20150068557 A | 6/2015 |
| KR | 20170038102 A | 4/2017 |
| KR | 20170058808 A | 5/2017 |
| KR | 20170103857 A | 9/2017 |
| KR | 101862491 B1 | 5/2018 |
| KR | 20230118420 A | 8/2023 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2003025093 | 3/2003 |
| WO | WO2005023649 | 3/2005 |
| WO | WO2005031297 | 4/2005 |
| WO | WO2005115583 | 12/2005 |
| WO | WO2006010432 | 2/2006 |
| WO | WO2007103649 | 9/2007 |
| WO | WO2008034424 | 3/2008 |
| WO | WO2008105269 | 9/2008 |
| WO | WO2009147983 | 12/2009 |
| WO | WO2010032734 | 3/2010 |
| WO | WO2010103992 | 9/2010 |
| WO | WO2011000447 | 1/2011 |
| WO | WO2011126043 | 10/2011 |
| WO | 2012037454 A2 | 3/2012 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2013145679 | 10/2013 |
| WO | WO2013153557 | 10/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016033515 | 3/2016 |
| WO | WO2016086322 | 6/2016 |
| WO | WO2016109854 | 7/2016 |
| WO | WO2022159604 | 7/2022 |
| WO | WO2022235839 | 11/2022 |
| WO | 2023129090 A2 | 7/2023 |

OTHER PUBLICATIONS

U.S. Appl. No. 17/190,720, filed Mar. 3, 2021, Mar. 3, 2021, West et al.
U.S. Appl. No. 17/222,886, filed Apr. 5, 2021, Apr. 5, 2021, Quanci et al.
U.S. Appl. No. 17/228,469, filed Apr. 12, 2021, Apr. 12, 2021, Quanci et al.
U.S. Appl. No. 17/228,501, filed Apr. 12, 2021, Apr. 12, 2021, Quanci et al.
U.S. Appl. No. 17/306,895, filed May 3, 2021, May 3, 2021, Quanci et al.
U.S. Appl. No. 17/321,857, filed May 17, 2021, May 17, 2021, Quanci et al.
U.S. Appl. No. 17/320,343, filed May 24, 2021, May 24, 2021, Quanci et al.
U.S. Appl. No. 17/363,701, filed Jun. 30, 2021, Jun. 30, 2021, Quanci et al.
U.S. Appl. No. 17/388,874, filed Jul. 29, 2021, Jul. 29, 2021, Quanci et al.
U.S. Appl. No. 17/459,380, filed Aug. 27, 2021, Aug. 27, 2021, Quanci et al.
U.S. Appl. No. 17/471,491, filed Sep. 10, 2021, Sep. 10, 2021, West et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.

(56) References Cited

OTHER PUBLICATIONS

Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-deadband-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
Brazilian Preliminary Office Action for Brazilian Application No. BR102013000283-6; Date of Mailing: Feb. 18, 2020; 7 pages.
Brazilian Examination Report for Brazilian Application No. BR102013000283-6; Date of Mailing: May 4, 2021; 9 pages.
Chinese Office Action in Chinese Application No. 201280078042.6; Date of Mailing: Oct. 10, 2017; 24 pages.
Examination Report in European Application No. 12890654.2, Date of Mailing Mar. 23, 2017.
India First Examination Report in Application No. 1150/KOLNP/2015; Date of Mailing: Oct. 29, 2018; 8 pages.
International Search Report and Written Opinion of International Application No. PCT/US2012/072181; Date of Mailing: Sep. 24, 2013; 13 pages.
U.S. Appl. No. 17/521,061, filed Nov. 8, 2021, Crum et al.
U.S. Appl. No. 17/526,477, filed Nov. 15, 2021, Quanci et al.
U.S. Appl. No. 17/532,058, filed Nov. 22, 2021, Quanci et al.
U.S. Appl. No. 17/584,672, filed Jan. 26, 2022, Quanci et al.
U.S. Appl. No. 17/947,520, filed Sep. 19, 2022, Quanci et al.
U.S. Appl. No. 17/967,615, filed Oct. 17, 2022, Quanci et al.
U.S. Appl. No. 18/047,916, filed Oct. 19, 2022, Quanci et al.
U.S. Appl. No. 18/052,739, filed Nov. 4, 2022, Quanci et al.
U.S. Appl. No. 18/052,760, filed Nov. 4, 2022, Quanci et al.
U.S. Appl. No. 18/168,142, filed Feb. 13, 2023, Quanci et al.
"High Alumina Cement-Manufacture, Characteristics and Uses," TheConstructor.org, https://theconstructor.org/concrete/high-alumina-cement/23686/; 12 pages.
"Refractory Castables," Victas.com, Dec. 28, 2011 (date obtained from WayBack Machine), https://www/vitcas.com/refractory-castables; 5 pages.
Tiwari, et al., "A novel technique for assessing the coking potential of coals/cole blends for non-recovery coke making process," Fuel, vol. 107, May 2013, pp. 615-622.
U.S. Appl. No. 18/313,622, filed May 8, 2023, Quanci et al.
U.S. Appl. No. 18/313,647, filed May 8, 2023, Quanci et al.
U.S. Appl. No. 18/321,530, filed May 22, 2023, Quanci et al.
U.S. Appl. No. 18/363,465, filed Aug. 1, 2023, Quanci et al.
U.S. Appl. No. 18/363,508, filed Aug. 1, 2023, Choi et al.
U.S. Appl. No. 18/366,244, filed Aug. 7, 2023, Quanci et al.
U.S. Appl. No. 18/466,549, filed Sep. 13, 2023, Quanci et al.
U.S. Appl. No. 18/469,704, filed Sep. 19, 2023, Crum et al.
U.S. Appl. No. 18/473,135, filed Sep. 22, 2023, Quanci et al.
U.S. Appl. No. 18/473,143, filed Sep. 22, 2023, Quanci et al.
U.S. Appl. No. 18/483,019, filed Oct. 9, 2023, West et al.
U.S. Appl. No. 18/486,021, filed Oct. 12, 2023, Quanci et al.
U.S. Appl. No. 18/492,913, filed Oct. 24, 2023, Quanci et al.
U.S. Appl. No. 18/501,488, filed Nov. 3, 2023, Quanci et al.
U.S. Appl. No. 18/501,795, filed Nov. 3, 2023, Quanci et al.
U.S. Appl. No. 18/506,616, filed Nov. 10, 2023, Quanci et al.
U.S. Appl. No. 18/506,746, filed Nov. 10, 2023, Quanci et al.
U.S. Appl. No. 18/511,148, filed Nov. 16, 2023, Quanci et al.
U.S. Appl. No. 18/511,621, filed Nov. 16, 2023, Quanci et al.
"Asbestos", Virginia Department of Health, https://www.vdh.virginia.gov/environmental-health/public-health-toxicology/asbestos/, updated 2023, 2 pages.
"Ceramic fibers wool—to 1,300° C.", gTeek, Dec. 29, 2017 (date obtained from google search tools), https://www.gteek.com/ceramic-fibers-woolp-to1-300-%C2%BOC, 15 pages.
Chaudhari, K., Cupola Furnace, engineersgalary.com Jan. 24, 2016; 4 pages.
De Cordova, et al. "Coke oven life prolongation—A multidisciplinary approach." 10.5151/2594-357X-2610 (2015) 12 pages.
"How Glass is Made," Corning, https://www.corning.com/worldwide/en/innovation/materials-science/glass/how-glass-made.html, 2 pages.
Ishiwata, et al. "Effect of coke diameter and oxygen concentration of blast on cupola operation." ISIJ International, 2011, vol. 51, pp. 1353-1359.
Ivanova, V. A. "Analysis of the requirements for foundry coke." IOP Conference Series: Materials Science and Engineering, 2020, vol. 986, pp. 1-6.
Kusiorowski, et al., "Thermal decomposition of different types of abestos," Journal of Thermal Analysis and Calorimetry . Feb. 2012, 109, 693-704 (2012).
Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.
Lipunov, et al. "Diagnostics of the Heating System and Lining of Coke Ovens," Coke and Chemistry, 2014, Vopl. 57, No. 12, pp. 489-492.
Pearson, D.E., "Influence of Geology on CSR (Coke Strength After Reaction with C02)," 2009, 8 pages.
Powell, et al. "Cupola Furnaces", ASM International, downloaded from http://dl.asminternational.org/handbooks/edited-volume/chapter-pdf/501030/a0005197.pdf; 9 pages.
U.S. Appl. No. 18/584,320, filed Feb. 22, 2024, West et al.
U.S. Appl. No. 18/586,236, filed Feb. 23, 2024, Quanci et al.
Item HT 56107 Briquette, 'H' Type Household or Domestic Use, SECV Brown Coal Mine, Yallourn, Victoria, circa 1925, Museums

(56) References Cited

OTHER PUBLICATIONS

Victoria Collections, https://collections.museumsvictoria.com.au/items/2286568, published on Mar. 2, 2021; 3 pages.

Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.

U.S. Appl. No. 18/770,274, filed Jul. 11, 2024, Jul. 11, 2024, Quanci et al.

U.S. Appl. No. 18/954,859, filed Nov. 21, 2024, Nov. 21, 2024, Quanci.

U.S. Appl. No. 18/954,882, filed Nov. 21, 2024, Nov. 21, 2024, Choi et al.

U.S. Appl. No. 18/955,181, filed Nov. 21, 2024, Nov. 21, 2024, Choi et al.

U.S. Appl. No. 18/958,671, filed Nov. 25, 2024, Nov. 25, 2024, Quanci et al.

U.S. Appl. No. 18/971,912, filed Dec. 6, 2024, Dec. 6, 2024, Quanci et al.

U.S. Appl. No. 18/972,005, filed Dec. 6, 2024, Dec. 6, 2024, Quanci et al.

U.S. Appl. No. 18/977,609, filed Dec. 11, 2024, Dec. 11, 2024, Quanci et al.

U.S. Appl. No. 19/054,358, filed Feb. 14, 2025, Feb. 14, 2025, Quanci et al.

Schlueter, R. "What's so good about coke made from coal, Aug. 29, 2016," Belleview News—Democrat, Rschuleter@bnd.com; 4 pages.

Seal School, *Coal* v. *Coke*|Fast differences and Comparison. Viewable on YouTube (Year:2020).

Gkotsis, et al., "Membrane-Based Technologies for Post-Combustion CO2 Capture from Flue Gases: Recent Progress in Commonly Employed Membrane Materials," Membranes 2023, 13, 898; 27 pages.

Mitsubishi Heavy Industries America, Inc., "Development and demonstration of wasteheat integration with solvent process for more efficient CO2 removal from coal fired flue gas", 2017NETL CO2 Capture Technology Project Review Meeting, Aug. 22, 2017, pp. 1-43.

\* cited by examiner

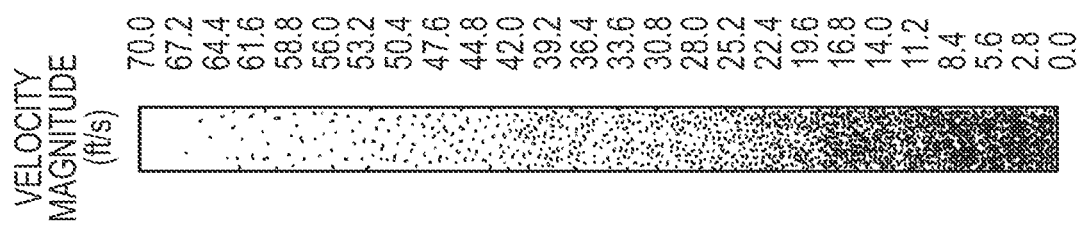
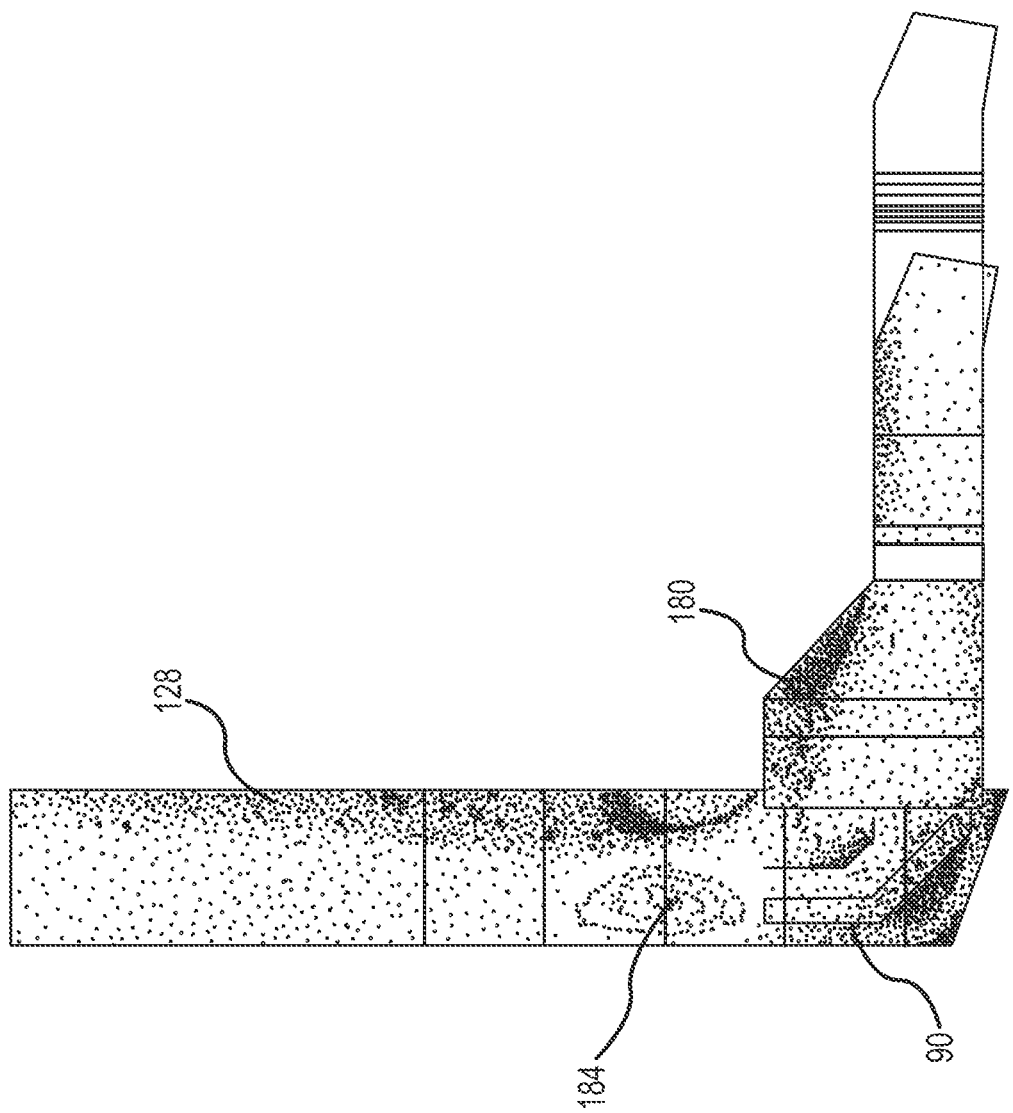
FIG. 7

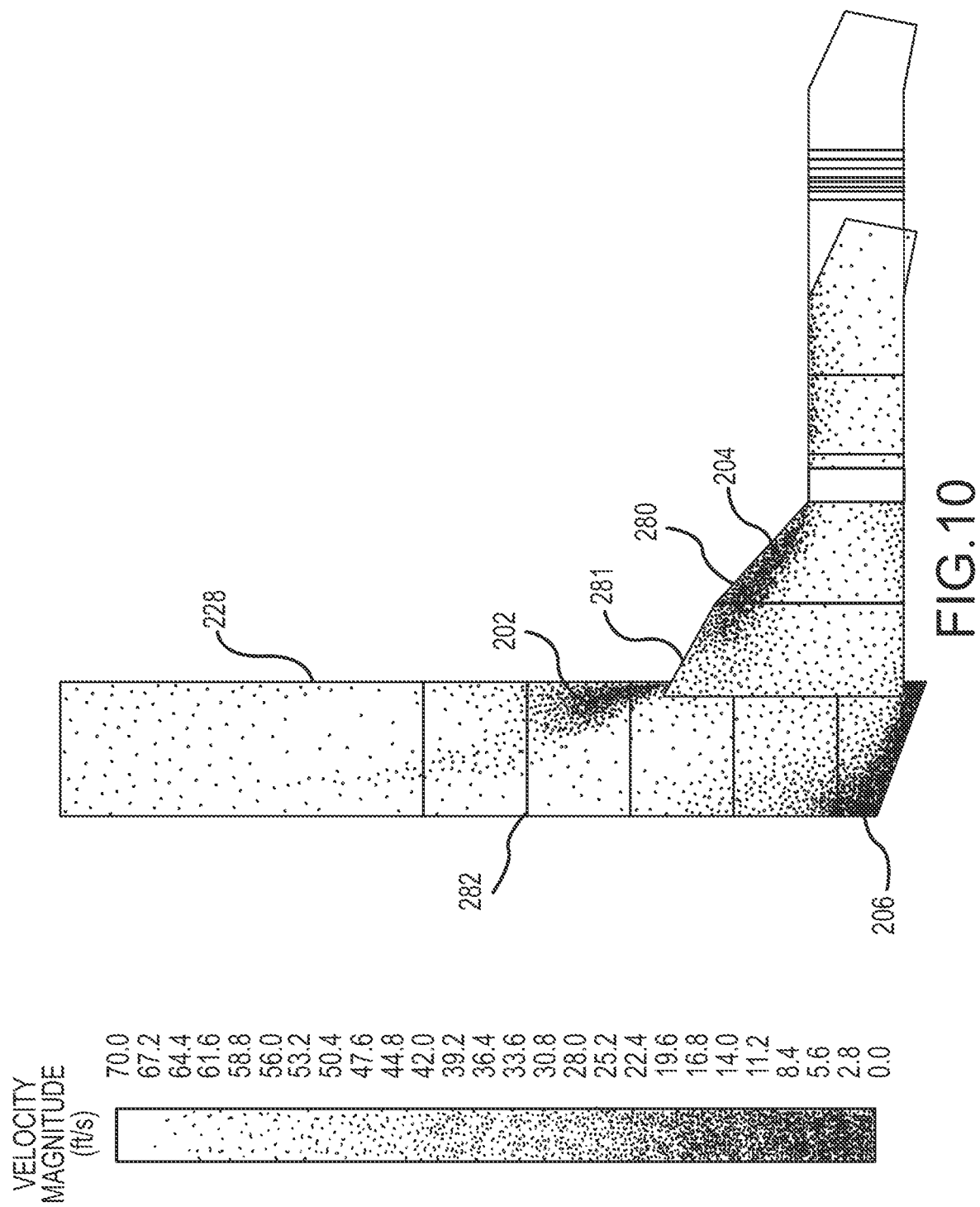

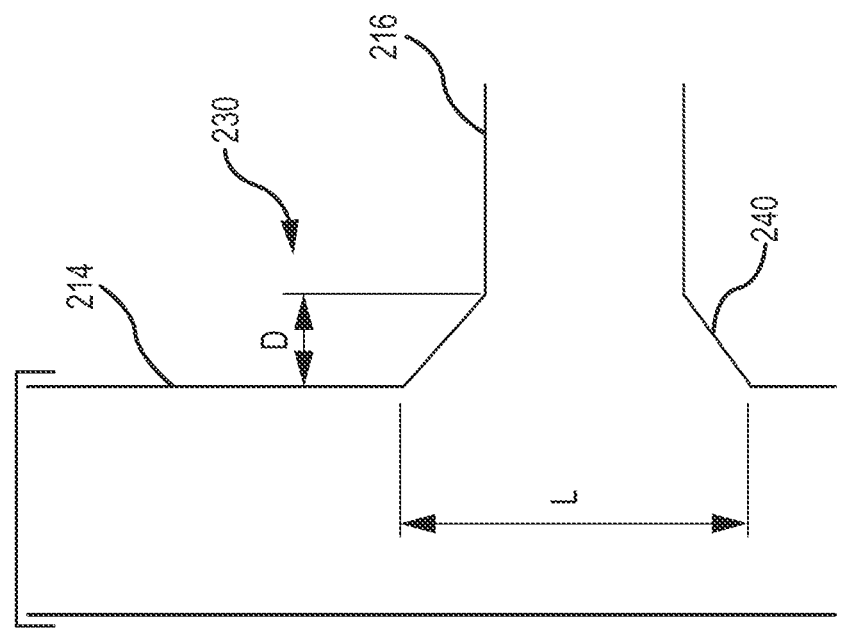
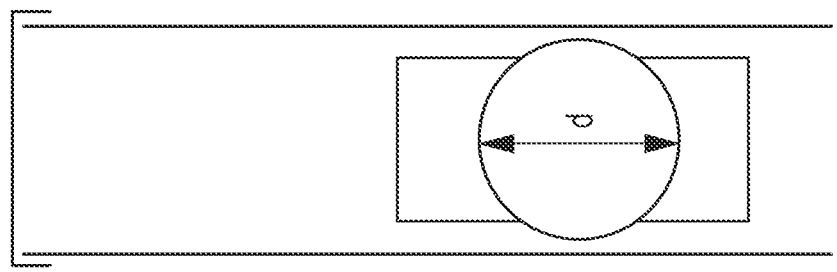
FIG. 11B
FIG. 11A

EXHAUST FLOW MODIFIER, DUCT INTERSECTION INCORPORATING THE SAME, AND METHODS THEREFOR

CROSS-REFERENCE TO RELATED APPLICATIONS

The present application is a divisional of U.S. patent application Ser. No. 15/281,891 filed Sep. 30, 2016, which is a divisional of U.S. patent application Ser. No. 13/730,673 filed Dec. 28, 2012, the disclosures of which are incorporated herein by reference in their entireties.

TECHNICAL FIELD

The present technology is generally directed to devices and methods for modifying fluid flow within a duct. More specifically, some embodiments are directed to flow modifiers and transition portions for improving the exhaust flow from a coke oven through a duct intersection.

BACKGROUND

Coke is a solid carbonaceous fuel that is derived from coal. Because of its relatively few impurities, coke is a favored energy source in a variety of useful applications. For example, coke is often used to smelt iron ores during the steelmaking process. As a further example, coke may also be used to heat commercial buildings or power industrial boilers.

In a typical coke making process, an amount of coal is baked in a coke oven at temperatures that typically exceed 2000 degrees Fahrenheit. The baking process transforms the relatively impure coal into coke, which contains relatively few impurities. At the end of the baking process, the coke typically emerges from the coke oven as a substantially intact piece. The coke typically is removed from the coke oven, loaded into one or more train cars (e.g., a hot car, a quench car, or a combined hot car/quench car), and transported to a quench tower in order to cool or "quench" the coke before it is made available for distribution for use as a fuel source.

The hot exhaust (i.e. flue gas) is extracted from the coke ovens through a network of ducts, intersections, and transitions. The intersections in the flue gas flow path of a coke plant can lead to significant pressure drop losses, poor flow zones (e.g. dead, stagnant, recirculation, separation, etc.), and poor mixing of air and volatile matter. The high pressure drop losses lead to higher required draft which can lead to leaks and a more difficult to control system. In addition, poor mixing and resulting localized hot spots can lead to earlier structural degradation due to accelerated localized erosion and thermal wear. Erosion includes deterioration due to high velocity flow eating away at material. Hot spots can lead to thermal degradation of material, which can eventually cause thermal/structural failure. This localized erosion and/or hot spots can, in turn, lead to failures at duct intersections. For example, the intersection of a coke plant's vent stack and crossover duct is susceptible to poor mixing/flow distribution that can lead to hot spots resulting in tunnel failures.

Traditional duct intersection designs also result in significant pressure drop losses which may limit the number of coke ovens connected together in a single battery. There are limitations on how much draft a coke plant draft fan can pull. Pressure drops in duct intersections take away from the amount of draft available to exhaust flue gases from the coke oven battery.

These and other related problems with traditional duct intersection design result in additional capital expenses. Therefore, a need exists to provide improved duct intersection/transitions that can improve mixing, flow distribution, minimize poor flow zones (e.g. dead, stagnant, recirculation, separation, etc.), and reduce pressure drop losses at the intersection thereby leading to improved coke plant operation as well as potentially lower costs to design, build, and operate a coke plant.

SUMMARY

Provided herein are contoured duct liners, turning vanes, transition portions, duct intersections, and methods of improving gas flow in an exhaust system. In an exemplary embodiment, a duct intersection comprises a first duct portion and a second duct portion extending laterally from a side of the first duct portion. The second duct portion may tee into the first duct portion. The second duct portion may extend laterally from the side of the first duct portion at an angle of less than 90 degrees.

At least one flow modifier is mounted inside one of the first and second duct portions. In one aspect of the technology described herein, the flow modifier is a contoured duct liner. In another aspect of the present technology, the flow modifier includes at least one turning vane.

In an embodiment, the contoured duct liner comprises a first contoured wall mated to an inside surface of the duct and a second contoured wall mated to the first contoured wall. In one aspect of the present technology, the contoured duct liner may be mounted inside the first duct portion. In another aspect of the present technology, the contoured duct liner is mounted inside the second duct portion. The second contoured wall may comprise a refractory material.

In another embodiment, the contoured duct liner comprises a first wall contoured to mate with an inside surface of a duct intersection and a second wall attached to the first wall. The second wall is contoured to modify the direction of gas flow within the duct intersection. In one aspect of the present technology, the second wall includes at least one convex surface.

In yet another embodiment, the duct intersection comprises a first duct portion and a second duct portion extending laterally from a side of the first duct portion. A transition portion extends between the first and second duct portions, wherein the transition portion has a length extending along a side of the first duct portion and a depth extending away from the side of the first duct portion. In an embodiment, the length is a function of the diameter of the second duct portion. In another embodiment, the length is greater than a diameter of the second duct portion. In a still further embodiment, the length is twice the depth.

Also provided herein is a coking facility exhaust system. In an embodiment the exhaust system comprises an emergency stack and a crossover duct extending laterally from a side of the emergency stack. The system also includes a contoured duct liner including a first wall mated to an inside surface of the emergency stack and a second wall attached to the first wall. The second wall is contoured to modify the direction of gas flow proximate an intersection of the emergency stack and crossover duct. The exhaust system may further comprise a second contoured duct liner mated to an inside surface of the crossover duct.

Also contemplated herein are methods for improving gas flow in an exhaust system. In one embodiment the method may include determining a location of a poor flow zone (e.g. dead, stagnant, recirculation, separation, etc.) within the duct intersection and mounting a flow modifier in the duct intersection at the determined location. In one aspect of the disclosed technology, the location is determined with a computer aided design system, such as a computational fluid dynamics (CFD) system. In other aspects of the disclosed technology, the location is determined by measuring conditions at the duct intersection, such as temperature, pressure, and/or velocity.

In another embodiment, a method of improving gas flow in an exhaust system including at least one duct intersection comprises determining a location of a poor flow zone within the duct intersection and injecting a fluid into the duct intersection at the determined location.

These and other aspects of the disclosed technology will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

BRIEF DESCRIPTION OF THE DRAWINGS

Non-limiting and non-exhaustive embodiments of the devices, systems, and methods, including the preferred embodiment, are described with reference to the following figures, wherein like reference numerals refer to like parts throughout the various view unless otherwise specified.

FIG. 7 is a side view in cross-section of a modified fan manifold indicating the velocity of gases traveling through the manifold and main stack;

FIG. 10 is a side view in cross-section of a fan manifold according to an exemplary embodiment indicating the velocity of gases traveling through the manifold and main stack;

FIG. 11A is a front view schematic representation of a duct intersection according to an exemplary embodiment;

FIG. 11B is a side view schematic representation of the duct intersection shown in FIG. 11A;

DETAILED DESCRIPTION

Provided herein is a contoured duct liner, a duct intersection, and methods of improving gas flow in an exhaust system. The described embodiments may be implemented as original designs or as retrofits to existing facilities. The disclosed designs have been found to improve flow, thermal conditions, and structural integrity at intersections or tie-ins in a coke oven or similar system. By optimizing the external and/or internal shape of intersections, the mixing can be improved, areas of relatively undesirable conditions can be minimized, and pressure drop losses at the intersection can be minimized. Reducing pressure losses at the intersections can help lower draft set point(s), which can lead to improved operation as well as potentially lower cost designs and maintenance. Furthermore, it can be advantageous to minimize the draft set point of the overall system to minimize infiltration of any unwanted outside air into the system.

Specific details of several embodiments of the technology are described below with reference to FIGS. 1-14. Other details describing well-known structures and systems often associated with coke making and/or duct design have not been set forth in the following disclosure to avoid unnecessarily obscuring the description of the various embodiments of the technology. Many of the details, dimensions, angles, and other features shown in the figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-14.

Figure 1:
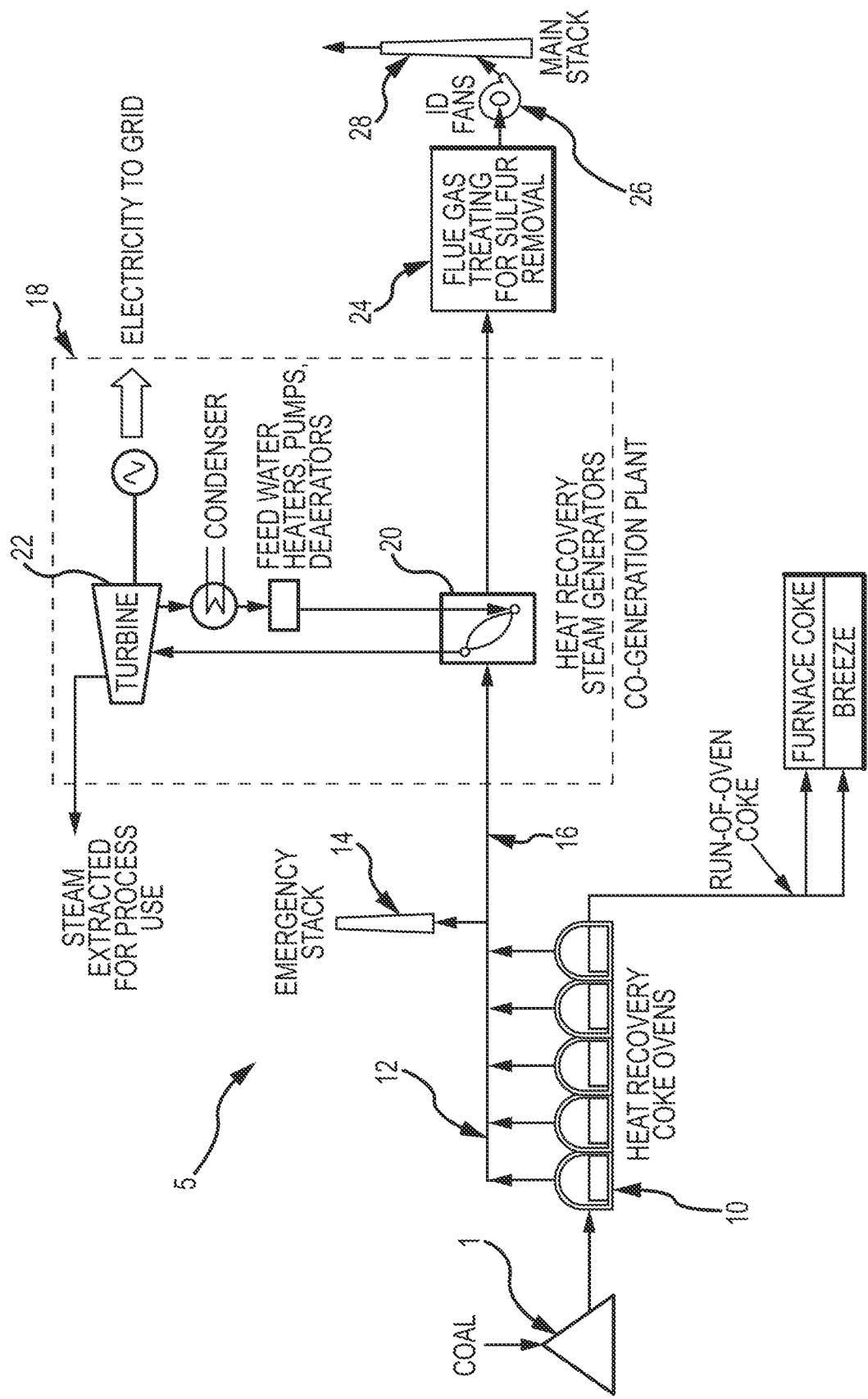
FIG. 1 is a schematic representation of a coke plant.

FIG. 1 illustrates a representative coke plant 5 where coal 1 is fed into a battery of coke ovens 10 where the coal is heated to form coke. Exhaust gases (i.e. flue gases) from the coke ovens are collected in a common tunnel 12 which intersects emergency stack 14. Cross-over duct 16 is also connected to common tunnel 12 via the emergency stack 14. Hot flue gases flow through the cross-over duct 16 into a co-generation plant 18 which includes a heat recovery steam generator (HRSG) 20 which in turn feeds steam turbine 22. The flue gases continue on to a sulfur treatment facility 24 and finally the treated exhaust gases are expelled through main stack 28 via duct fans 26, which provide negative pressure on the entire system in addition to the draft created by gases rising through the main stack 28.

Figure 2:
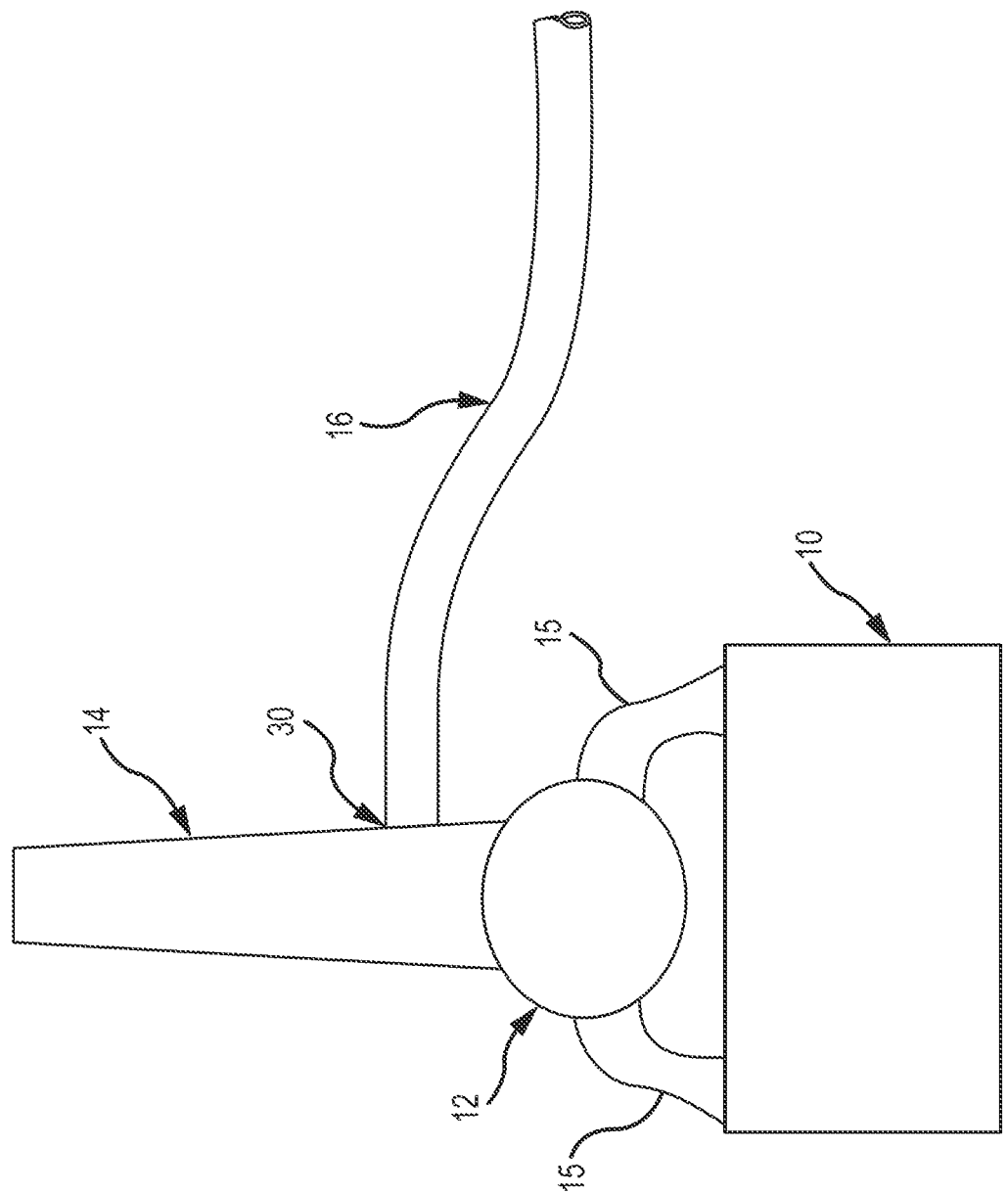
FIG. 2 is a schematic representation of a representative coke oven and associated exhaust system.

With further reference to FIG. 2, it can be appreciated that coke ovens 10 are connected to the common tunnel 12 via uptakes 15. Common tunnel 12 extends horizontally along the top of the coke ovens 10. An emergency stack 14 extends vertically from common tunnel 12 as shown. Cross-over duct 16 intersects emergency stack 14 at a duct intersection 30. In normal operation, the emergency stack 14 is closed whereby exhaust gases travel through the cross-over duct 16 to the co-generation plant 18 (see FIG. 1). In the event of a problem with the co-generation plant 18, or other downstream equipment, the emergency stack 14 may be opened to allow exhaust gases to exit the system directly. While the figures show the common tunnel 12 and cross-over duct 16 intersecting the emergency stack 14 at different elevations, the common tunnel 12 and cross-over duct 16 may intersect the emergency stack 14 at the same elevation. Furthermore, the technology disclosed herein may be applied to the intersections whether they are at the same elevation or different elevations.

Figure 3:
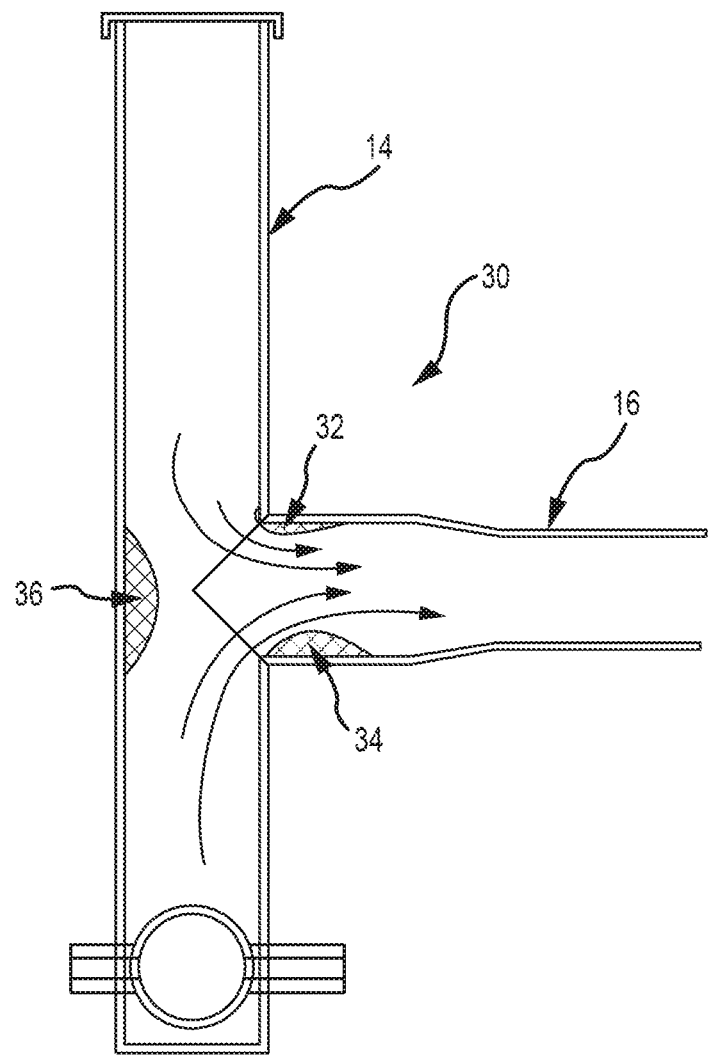
FIG. 3 is a side view in cross-section of an emergency stack and cross-over duct intersection indicating various flow anomalies near the intersection.

FIG. 3 illustrates various flow anomalies present in traditional duct intersections, such as duct intersection 30. Flow anomaly 32 is a point of localized combustion that is due to poor flow/distribution. An additional area of poor flow/mixing distribution 36 is located in the emergency stack 14 across from the cross-over duct 16. A poor flow zone 34 (e.g. dead, stagnant, recirculation, separation, etc.) is located in cross-over duct 16. These poor flow zone areas contain separated flows which can dissipate useful flow energy. These potential poor flow spaces can also contain unwanted, unsteady vortical flow, sometimes enhanced by buoyancy or chemical reactions, which can contribute to unwanted, poor acoustics, forced harmonics, potential flow instabilities, and incorrect instrument readings. Incorrect instrument readings may occur if measurements are made in a poor flow zone that has conditions not representative of flow in the duct. Because of the nature of the poor flow zones, these areas can also cause particle drop out and promote particle accumulation.

Figure 4:
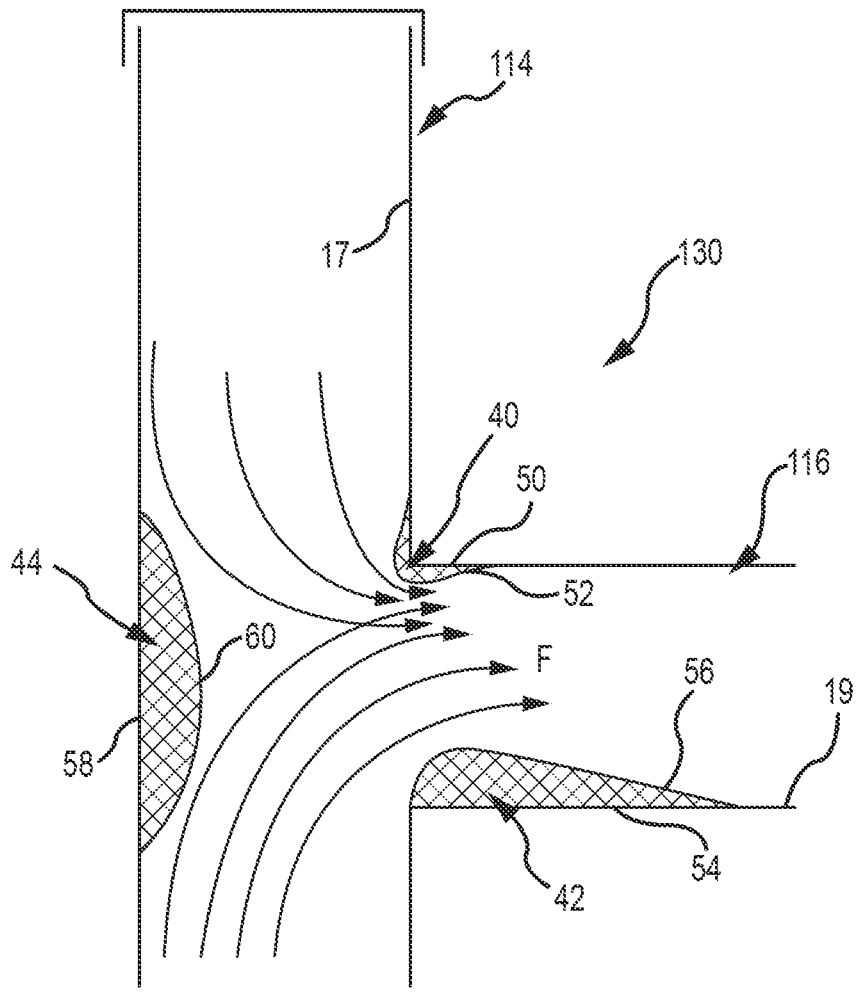
FIG. 4 is a side view in cross-section of a duct intersection according to an exemplary embodiment.

FIG. 4 illustrates an improved duct intersection 130 according to an exemplary embodiment. Duct intersection 130 includes a first duct portion in the form of emergency stack 114 and a second duct portion in the form of cross-over duct 116 that extends laterally from a side of the emergency stack 114. In this embodiment, duct intersection 130 includes a plurality of flow modifiers (40, 42, 44) to improve exhaust flow. For example, flow modifier 40 is in the form of a contoured duct liner that is positioned at the intersection 130 of emergency stack 114 and cross-over duct 116. Flow modifier 40 occupies the area where traditional designs have poor flow and mixing such as flow anomaly 32 in FIG. 3. Flow modifier 42 is disposed in cross-over duct 116 to occupy the poor flow zone 34 shown in FIG. 3. Flow modifier 44 is disposed in the emergency stack 114 opposite the cross-over duct 116 and, in this case, occupies the poor mixing distribution region 36 shown in FIG. 3. With the addition of flow modifiers 40, 42, and 44 the flow F within intersection 130 is improved (see FIG. 4).

The duct liners reshape the internal contours of the duct, inherently changing the nature and direction of the flow path among other effects. The duct liners can be used to smooth or improve flow entrance or provide better transition from one path to another especially when there are limitations to do so with the duct shape. The contoured duct liners can be used to alleviate wall shear stress/erosion stemming from high velocities and particle accumulation from settling and/or particle impaction, which could result in slow or poor flow zones. The contoured duct liners also provide better duct transitions, or paths, for better flow transition and movement, mitigation of stress and thermal concentrations, and mitigation of flow separation, etc.

With continued reference to FIG. 4 it can be appreciated that, in this embodiment, the contoured duct liners 40, 42, and 44 are each comprised of a first contoured wall mated to an inside surface of the duct intersection and a second contoured wall mated to the first contoured wall. For example, contoured duct liner 40 includes a first contoured wall 50 which is mated to the inside surface 17 of emergency stack 114 and inside surface 19 of cross-over duct 116. Duct liner 40 also includes a second contoured wall 52 that is mated to the first contoured wall 50. In this case, the second contoured wall 52 is convex and extends into the flow F of the flue gases traveling through the duct intersection 130. Contoured duct liner 42 includes a first contoured wall 54 which is mated to an inside surface 19 of the cross-over duct 116. A second contoured wall 56 is mated to the first contoured wall 54 and is also convex. Similarly, contoured duct liner 44 includes a first contoured wall 58 mated to inside surface 17 of the emergency stack 114 and includes a second contoured wall 60 mated to the first contoured wall 58.

The first contoured walls of the contoured duct liners may be attached to the inside surfaces 17 and 19 by welding, fasteners, or the like. Similarly, the second contoured walls may be attached to their respective first contoured walls by appropriate fasteners or by welding. As one of ordinary skill in the art will recognize, the contoured duct liners may be comprised of various materials which are suitable for corrosive, high heat applications. For example, first contoured walls 50, 54, and 58 may be comprised of steel or other suitable material. The second contoured walls 52, 56, and 60 may comprise a refractory material such as ceramic that is capable of resisting the heat associated with the flue gases and local combustion. The selection of materials can be dependent on the thermal, flow, and chemical properties of the flue gases. Because the flue gases can be of varied temperatures, velocities, chemical composition, in which all can depend on many factors such as the time in the coking cycle, flow control settings, ambient conditions, at the locations in the coking oven system, etc., the material selection can vary as well. The internal lining layers for the hot duct tie-ins could have more significant refractory layers than for cold ducts. Selection of appropriate materials may take into account min/max temperatures, thermal cycling, chemical reactions, flow erosion, acoustics, harmonics, resonance, condensation of corrosive chemicals, and accumulation of particles, for example.

In an embodiment, the flow modifiers may comprise a multilayer lining that is built up with a relatively inexpensive material and covered with a skin. In yet another embodiment, refractory or similar material can be shaped via gunning (i.e. spraying). Better control of shaping via gunning may be accomplished by gunning in small increments or layers. In addition, a template or mold may be used to aid the shaping via gunning. A template, mold, or advanced cutting techniques may be used to shape the refractory (e.g. even in the absence of gunning for the main shape of an internal insert) for insertion into the duct and then attached via gunning to the inner lining of the duct. In yet another embodiment, the flow modifier may be integrally formed along the duct. In other words, the duct wall may be formed or "dented" to provide a convex surface along the interior surface of the duct. As used herein, the term convex does not require a continuous smooth surface, although a smooth surface may be desirable. For example, the flow modifiers may be in the form of a multi-faceted protrusion extending into the flow path. Such a protrusion may be comprised of multiple discontinuous panels and/or surfaces. Furthermore, the flow modifiers are not limited to convex surfaces. The contours of the flow modifiers may have other complex surfaces that may be determined by CFD analysis and testing, and can be determined by design considerations such as cost, space, operating conditions, etc.

Figure 5:
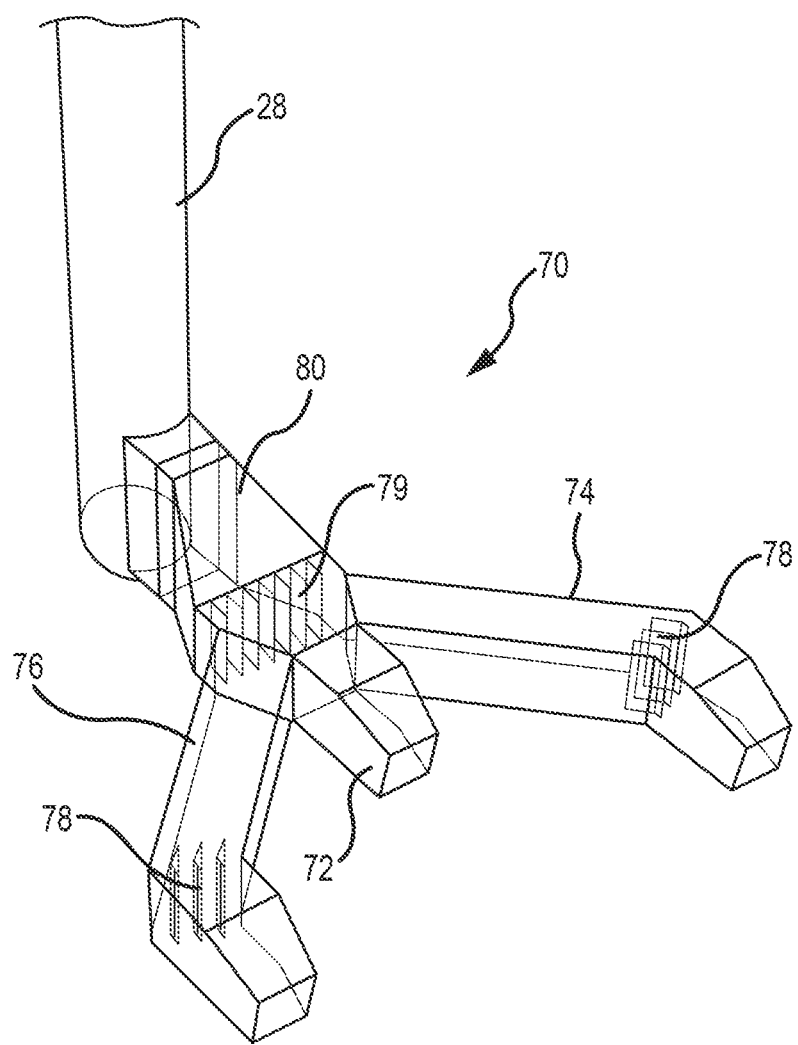
FIG. 5 is a perspective view of a fan manifold that extends between the duct fan and main stack of a coke plant.
Figure 6:
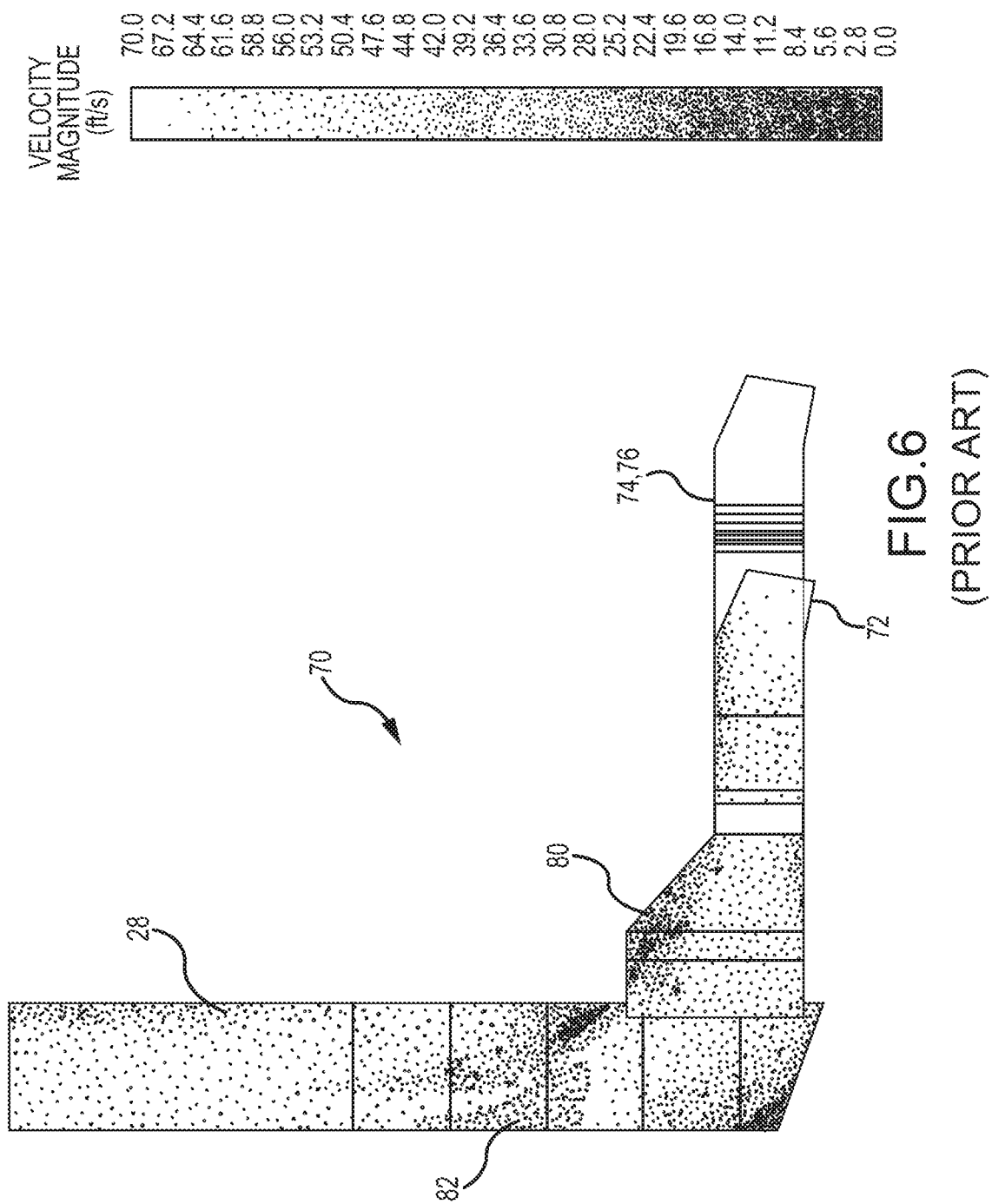
FIG. 6 is a side view in cross-section of a traditional fan manifold indicating the velocity of gases traveling through the manifold and main stack.

FIG. 5 illustrates a traditional fan manifold 70 that extends between the duct fans 26 and main stack 28 (see FIG. 1). Fan manifold 70 comprises a plurality of branches 72, 74, and 76 which all intersect into plenum 80. As shown in the figure, branches 74 and 76 include flow diverters 78 while plenum 80 includes flow straightener 79. With reference to FIG. 6, which indicates velocity magnitude in the fan manifold 70, traditional fan manifold designs result in a high velocity flow 82 which can damage the duct as a result of high shear stress. In contrast, FIG. 7 illustrates a fan plenum 180 intersection which includes a turning vane assembly 90. In this case, the magnitude of the velocity flowing next to the surface of main stack 128 is much lower than in the conventional duct configuration shown in FIG. 6. The higher flow velocity 184 is displaced inward away from the inside wall of the main stack 128, thereby reducing shear stress on the wall and helping to prevent erosion and corrosion of the stack. Turning vanes inside the duct help direct the flow path for a more efficient process. Turning vanes can be used to better mix flow, better directing of flow, and mitigation of total pressure losses, for example.

Figure 8:
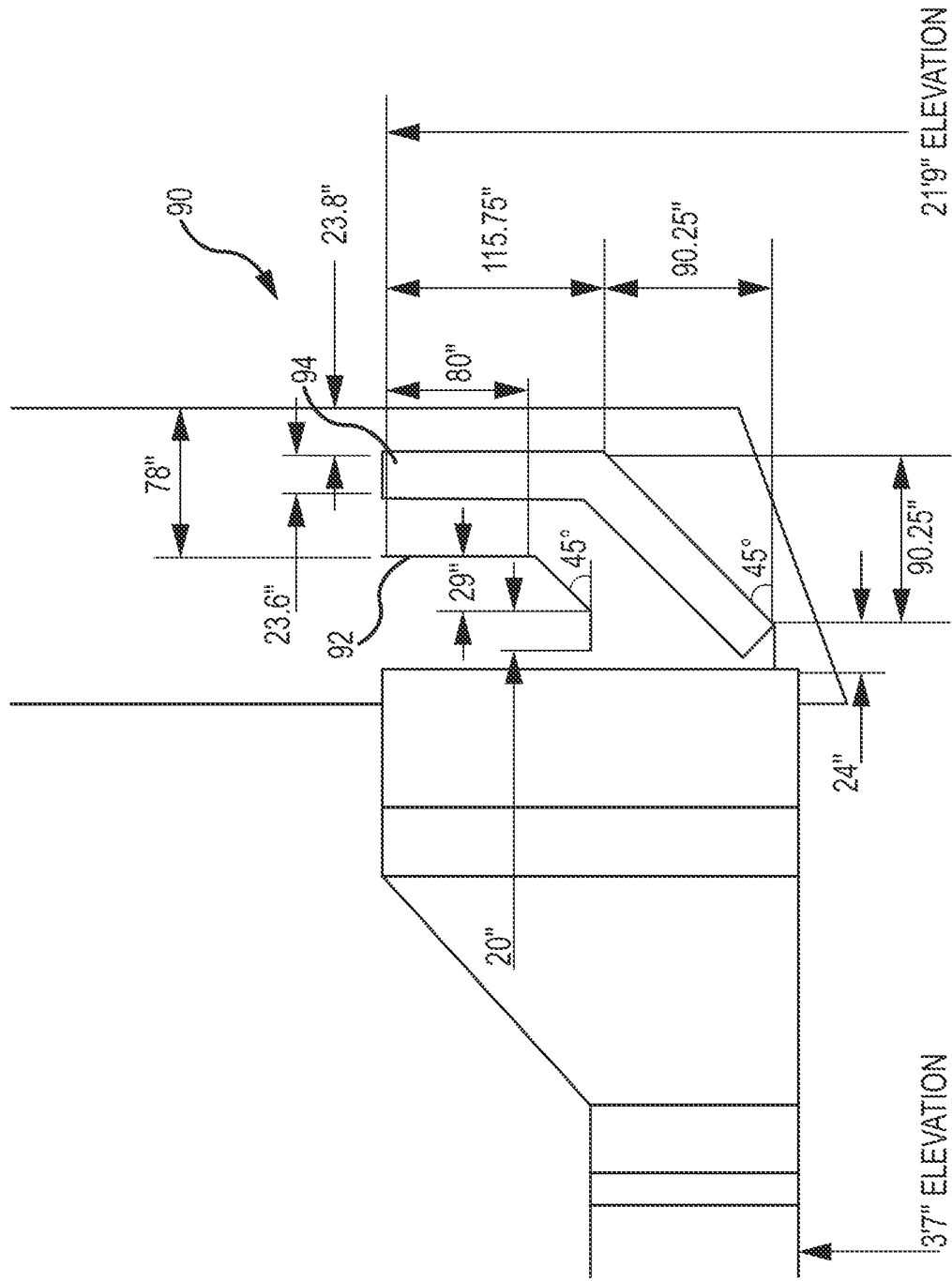
FIG. 8 is a side view in cross-section of a turning vane assembly according to an exemplary embodiment.
Figure 9:
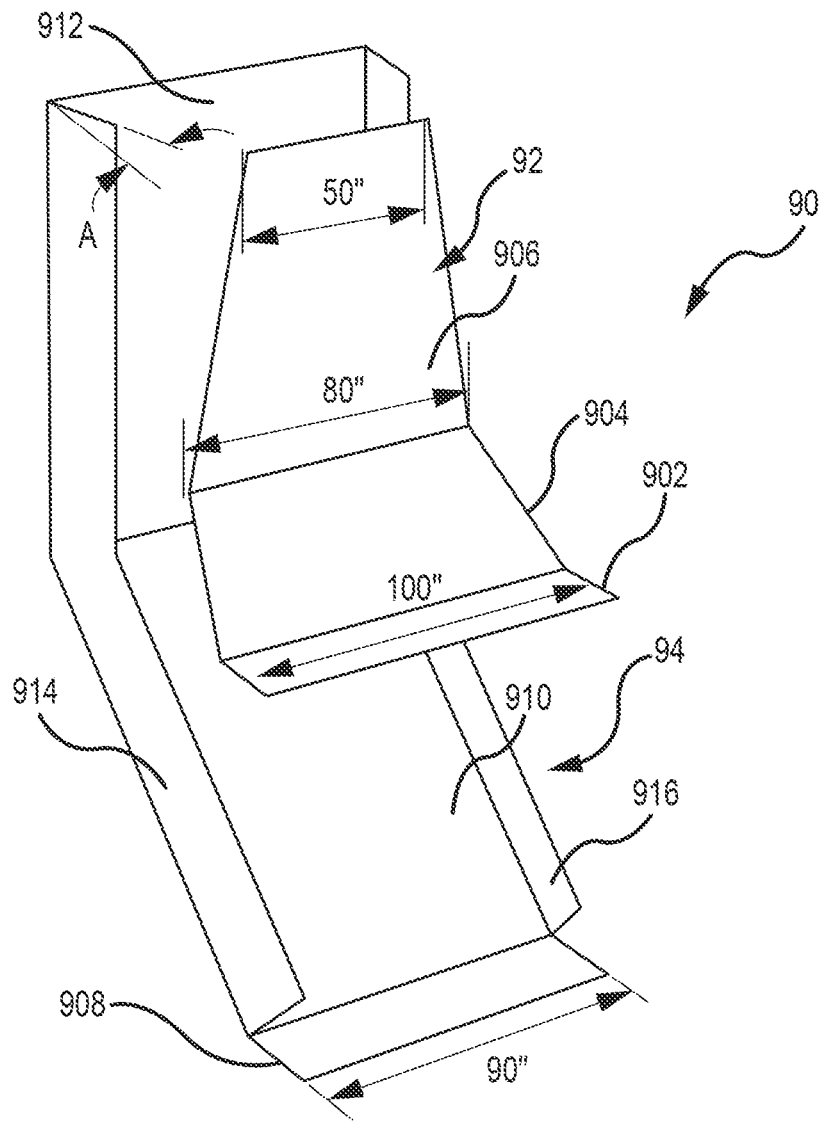
FIG. 9 is a perspective view of the turning vane assembly shown in FIG. 8.

With reference to FIGS. 8 and 9, the turning vane assembly 90 includes an inner vane 92 and an outer vane 94. In this embodiment, both the inner and outer vanes are disposed in the main stack 128. FIG. 8 provides exemplary dimensions by which a turning vane assembly could be constructed. However, these dimensions are exemplary and other dimensions and angles may be used. As perhaps best shown in FIG. 9 the inner vane 92 includes a leading portion 902 that connects to an angled portion 904, which, in turn, connects to trailing portion 906. As shown in the figure, the angled portion 904 tapers from a 100 inch width to an 80 inch width. Similarly, the trailing portion 906 tapers from an 80 inch width to a 50 inch width. Here again, the dimensions are only representative and may vary. In this embodiment, the angled portion 904 is angled at approximately 45 degrees; however, other angles may be used depending on the particular application. Outer vane 94 includes a leading portion 908 connected to an angled portion 910 which in turn is connected to a trailing portion 912. Outer turning vane 94 also includes side walls 914 and 916 as shown. Side walls 914 and 916 are canted inward towards the angled and trailing portions 910 and 912 at an angle A. In this embodiment angle A is approximately 10 degrees. Turning vane assembly 90 may be mounted or assembled into the main stack 128 with suitable fasteners or may be welded in place, for example.

In an exemplary embodiment shown in FIG. 10, a fan manifold plenum 280 intersects main stack 228 with a ramped transition. In this case, it can be appreciated that the fan manifold plenum 280 has an upper wall 281 which transitions into the main stack 228 at an angle. As shown by the velocity magnitude 282, this results in a lower flow velocity magnitude than with traditional fan manifold designs shown in FIGS. 5 and 6. It has been found that improving the intersection/transition from the duct fan to the main stack can reduce wear and erosion as well as ash buildup in the main stack. In addition to the ramped transition, contoured duct liners and/or turning vanes may be used together in combination. For example, contoured duct liners may be located in the slower velocity regions 202, 204, and 206 as shown in FIG. 10.

FIGS. 11A and 11B illustrate a duct intersection 230 according to another exemplary embodiment. In this embodiment, the duct intersection 230 includes an emergency stack 214 and a cross-over duct 216 with a transition portion 240 extending therebetween. Changing the size of the duct cross sectional areas near or at intersections can help improve flow performance. In general, increasing the size of the flow cross sectional area as in transition portion 240 can help reduce flow losses. The transition portion can help better transition flow from a duct to a joining duct at tie-ins or intersections. The transitions can be flared, swaged, swept, or the like to provide the desired flow behavior at the intersections. In addition, the transitions may converge or diverge with respect to the direction of flow. Converging and diverging portions may be used in combination, e.g. the duct may first converge and then diverge or vice versa. Furthermore, it should be understood that the embodiments may be implemented in various combinations. For example, a turning vane assembly, such as described above with respect to FIGS. 7-9, may be used in conjunction with the duct liners, whether fabricated or gunned in place, as well as transition portions.

Figure 12B:
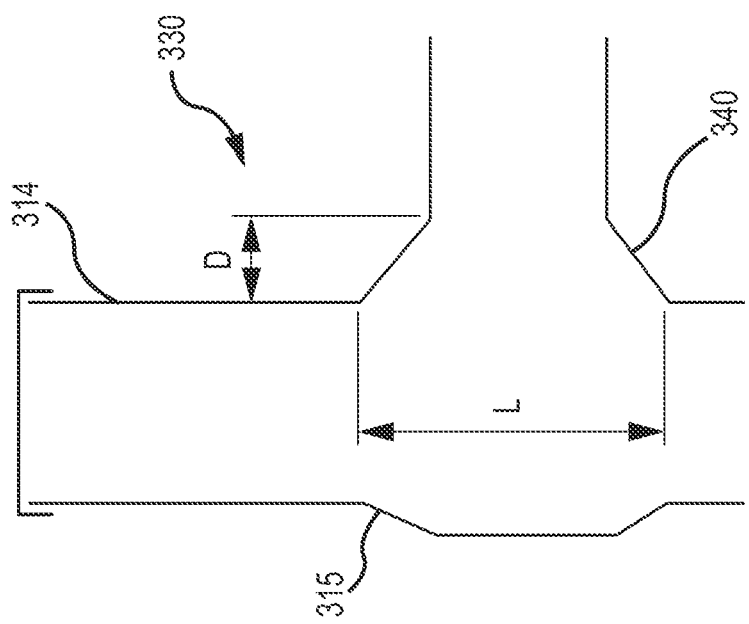
FIG. 12B is a side view schematic representation of the duct intersection shown in FIG. 12A.
Figure 12A:
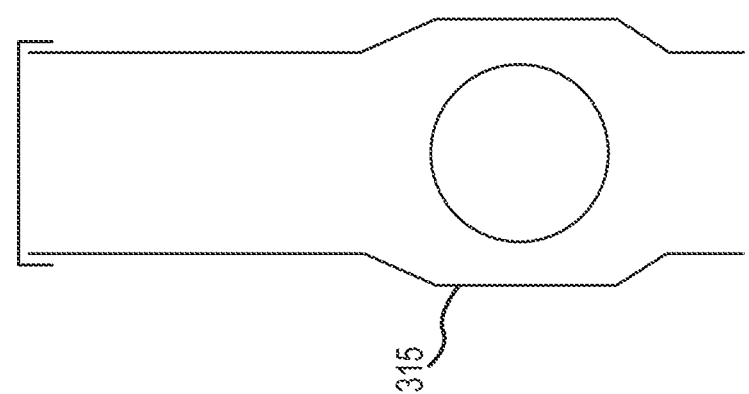
FIG. 12A is a front view schematic representation of a duct intersection according to an exemplary embodiment.
Figure 13:
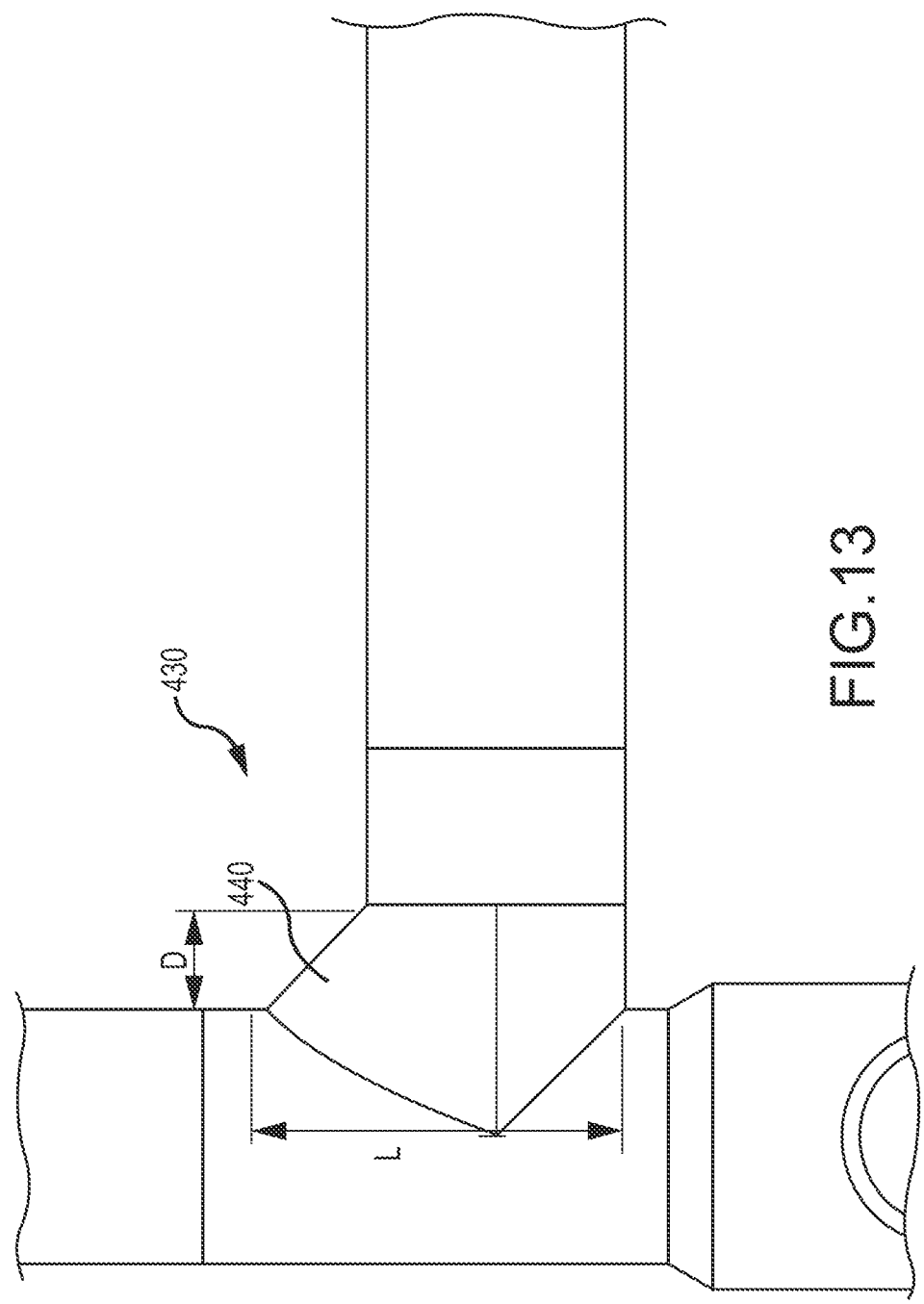
FIG. 13 is a side view of a duct intersection according to another exemplary embodiment.

The transition portion 240 has a length L extending along a side of the exhaust duct and a depth D extending away from the side of the exhaust duct. In this embodiment, the length is greater than a diameter d of the cross-over duct 216. The length L may be a function of the duct diameter d or the depth D. For example, the length L may be twice the depth D. FIGS. 12A and 12B illustrate a duct intersection 330 including a transition portion 340 that is similar to that shown in FIGS. 11A and 11B, except in this case the exhaust stack 314 includes an enlarged annular region 315 that is adjacent to the intersection 330. FIG. 13 illustrates yet another embodiment of a duct intersection 430 with an asymmetric transition portion 440. Depending on the desired design performance, external fins could be added to help enhance heat transfer with the surrounding ambient air. For example, external fins from the surfaces could be used to help cool localized hot spots.

Duct intersections can be designed, retrofitted, or modified to introduce fluids such as oxidizers (for better combustion or to remove PIC's, products of incomplete combustion), liquids such as water, fuels, inert gases, etc. to help better distribute combustion and mitigate hot spots or allow cooling of the hot stream. For example, fluid could be introduced to provide a boundary layer of cold inert fluid to mitigate hot spots at affected wall surfaces. The fluids, which could include liquids such as water, inert or other gases, could be used for cooling or mitigating certain chemical reactions. The ducts can be modified to accommodate ports or additional pathways for introducing fluids. Fluid introduction, if introduced from a pressurized source, could also create entrainment, thereby improving mixing or flow energy.

Figure 14:
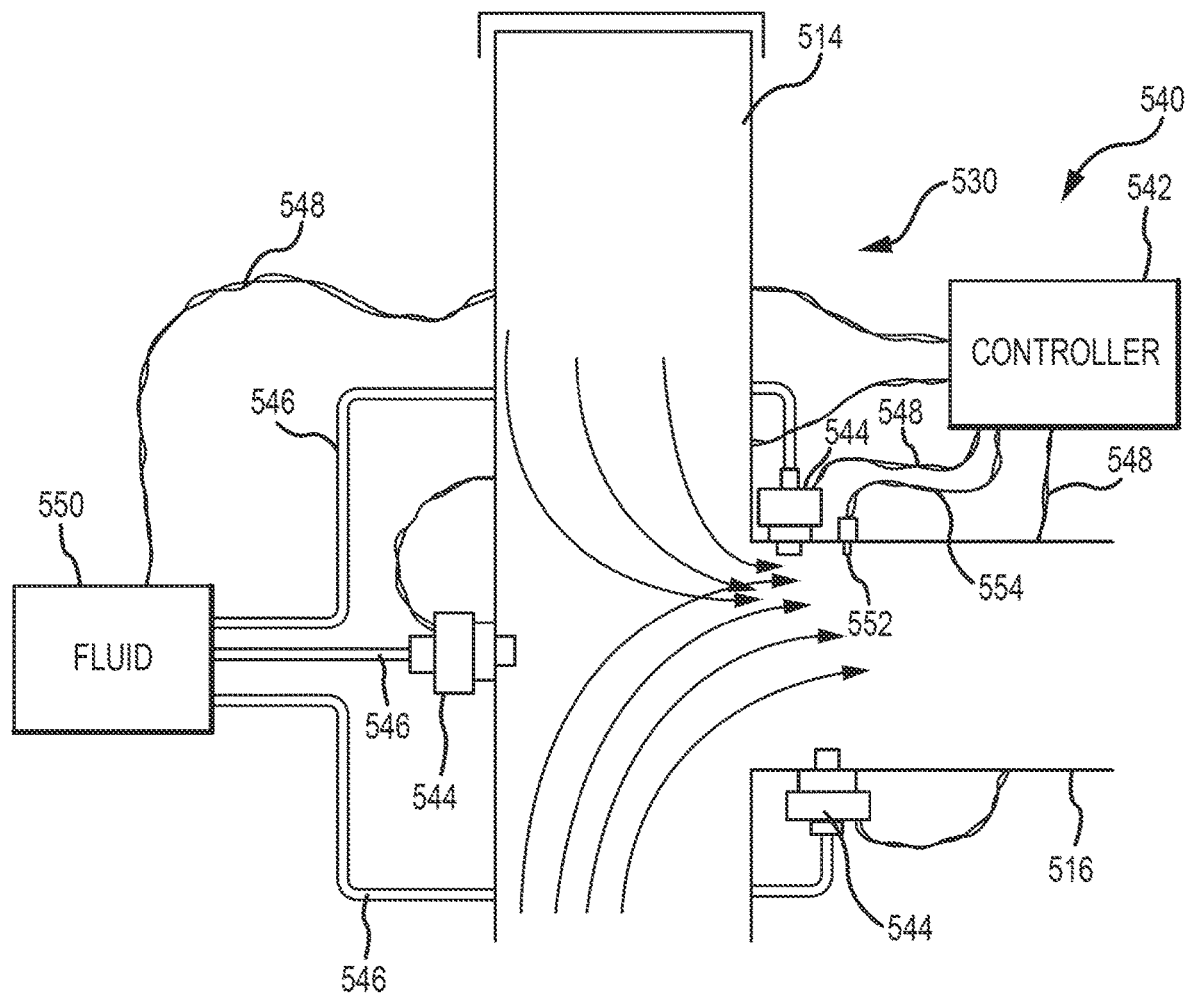
FIG. 14 is a schematic representation of a fluid injection system for use at a duct intersection.
Figure 15A:
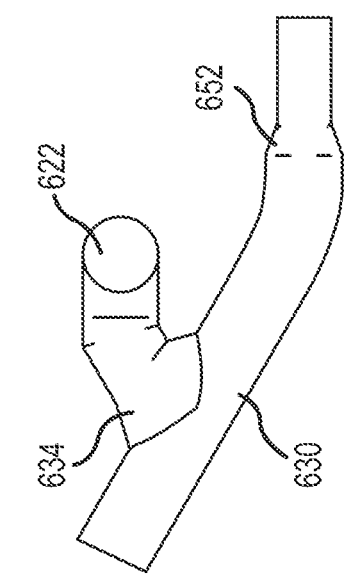
FIG. 15A is a perspective view of an intermediate HRSG tie in with transition pieces at the tie-in joints.
Figure 15B:
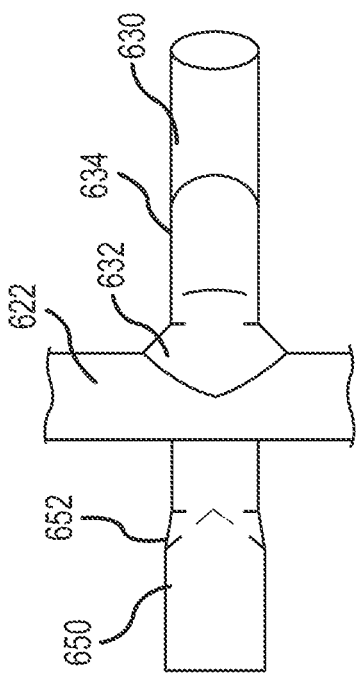
FIG. 15B is a side view of an intermediate HRSG tie in with transition pieces at the tie-in joints.
Figure 15C:
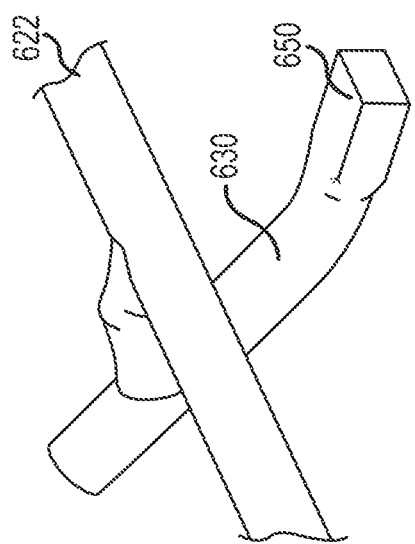
FIG. 15C is a perspective view of an intermediate HRSG tie in with transition pieces at the tie-in joints.
Figure 15D:
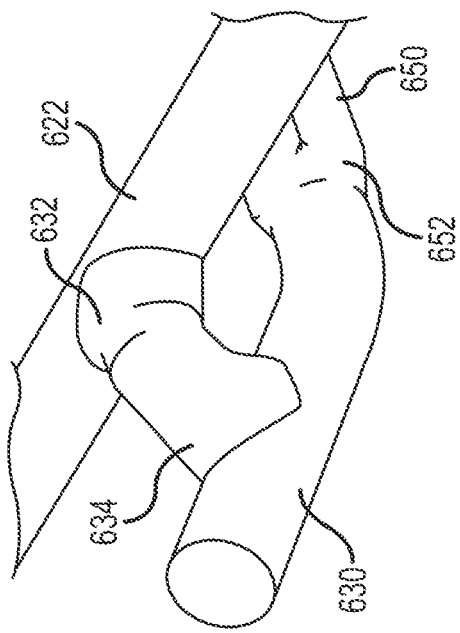
FIG. 15D is a top view of an intermediate HRSG tie in with transition pieces at the tie-in joints.

FIG. 14 illustrates a duct intersection 530 including a fluid injection system 540. Fluid injection system 540 is operative to inject fluid at particular regions in the intersection 530 to energize or direct flow, as well as insulate the surface of the ducts from exhaust gases. Fluid injection system 540 includes a controller 542 which is connected to a plurality of valves, or fluid injectors 544, via wiring 548. Each injector 544 is connected by tubing 546 to a fluid reservoir 550. It should be understood that the term fluid encompasses liquids as well as gases. Thus, the injection system 540 may inject liquids or gases into the exhaust flow. The injectors may be spaced optimally depending on design conditions. The injectors can inject fluid transversely into the duct, as shown in FIG. 14. Alternatively, the injectors could inject external fluid axially or along the exhaust flow direction at various locations. The injectors could also inject fluid at different injection angles. The direction and method of injection depends on the conditions that exist at the tie-ins and intersections. The injected fluid may come from an external pressurized source. In another embodiment, the fluid may be entrained through a port or valve by the draft of the exhaust flow.

The fluid injection system 540 may also include various sensors, such as temperature sensor 552 connected to controller 542 via cable 554. Various sensors, such as sensor 552, may provide feedback to controller 542 such that fluid may be injected at appropriate times. While the embodiment is illustrated as having a single temperature sensor, other additional sensors of different types of sensors may be employed in providing control feedback to controller 542. For example, other sensor may include pressure, velocity, and emissions sensors, such as an oxygen sensor.

The fluid injection system 540 may be used in conjunction with the contoured duct liners, turning vanes, and transition portions disclosed above. The contoured duct liners in conjunction with the fluid injection system may extend the use of the duct intersection as a true mixing zone and potentially a combustion chamber. Air and other additives (e.g. oxygen) may be injected into the intersection to allow better combustion and use of the tunnels as extended combustion zones. Also, a well-mixed duct intersection may be configured to act as a second combustion chamber. The addition of extra air into the duct intersection mixing zone can burn any excess flue gas and even cool off the intersection with excess air or other gases, such as nitrogen. For example, if the common tunnel is too hot and fully combusted, air may be injected to cool the process. In contrast, if the flue gas is not completely combusted before entering the heat recovery steam generator (HRSG), it could reduce the HRSG tubes, which are typically made of metal, leading to accelerated corrosion and failure. In this case, an oxidizer is added, such as air, to burn all the combustibles before entering the HRSG.

Although the embodiments have been described with respect to a duct intersection between an emergency stack and cross-over duct, the disclosed technology may be applicable to hot duct tie-ins, cold duct tie-ins, stack junctions, and HRSGs. For example, as shown in FIGS. 15A-15D, an intermediate HRSG tie in may include transition pieces (632, 634, 652) at the tie-in joints. Transitions 632 and 634 connect duct 622 to duct 630. Duct 630 connects to a rectangular tube 650 via transition piece 652.

Also contemplated herein are methods of improving gas flow in an exhaust system that includes at least one duct intersection. The methods may include any procedural step inherent in the structures described herein. In an embodiment, the method comprises determining a location of a low or poor flow zone, an area of poor combustion, or an area of poor mixing (i.e. areas of relatively undesirable conditions) within the duct intersection and providing a flow modifier at the determined location. Providing a flow modifier may include, for example and without limitation, mounting a duct liner within the duct, gunning a refractory material to the inside of the duct, mounting turning vanes within the duct, forming a convex surface along the duct, and combinations of the above. The location may be determined with a computer aided design system, such as a CFD system. The location may also be determined by measuring conditions at the duct intersection, such as temperature, pressure, and velocity. In another embodiment the method comprises determining a location of a poor flow zone within the duct intersection and injecting a fluid into the duct intersection at the determined location.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

EXAMPLES

1. A duct intersection, comprising:
   a first duct portion;
   a second duct portion extending laterally from a side of the first duct portion; and
   at least one flow modifier disposed inside one of the first and second duct portions.

2. The duct intersection according to claim 1, wherein the flow modifier is a contoured duct liner.

3. The duct intersection according to claim 2, wherein the contoured duct liner comprises a first contoured wall mated to an inside surface of the duct and a second contoured wall mated to the first contoured wall.

4. The duct intersection according to claim 3, wherein the second contoured wall comprises a refractory material.

5. The duct intersection according to claim 2, wherein the second duct portion tees into the first duct portion.

6. The duct intersection according to claim 5, wherein the contoured duct liner is mounted inside the first duct portion.

7. The duct intersection according to claim 5, wherein the contoured duct liner is mounted inside the second duct portion.

8. The duct intersection according to claim 1, wherein the flow modifier includes at least one turning vane.

9. The duct intersection according to claim 1, wherein the flow modifier comprises molded refractory material.

10. The duct intersection according to claim 1, wherein the second duct portion extends laterally from the side of the first duct portion at an angle of less than 90 degrees.

11. A contoured duct liner for use in a duct intersection, comprising:
    a first wall contoured to mate with an inside surface of a duct intersection; and
    a second wall attached to the first wall, wherein the second wall is contoured to modify the direction of gas flow within the duct intersection.

12. The contoured duct liner according to claim 11, wherein the second wall includes at least one convex surface.

13. The contoured duct liner according to claim 11, wherein the second wall comprises a refractory material.

14. A coking facility exhaust system, comprising:
    an emergency stack;
    a crossover duct extending laterally from a side of the emergency stack; and
    a contoured duct liner, including a convex surface operative to modify the direction of gas flow proximate an intersection of the emergency stack and crossover duct.

15. The coking facility exhaust system according to claim 14, further comprising a second contoured duct liner disposed on an inside surface of the crossover duct.

16. An improved coking facility exhaust system including an emergency stack and a crossover duct extending laterally from a side of the emergency stack, the improvement comprising:

a contoured duct liner, including a convex surface operative to modify the direction of gas flow proximate an intersection of the emergency stack and crossover duct.

17. A method of improving gas flow in an exhaust system including at least one duct intersection, the method comprising:
determining a location having undesirable flow characteristics within the duct intersection; and
providing a flow modifier in the duct intersection at the determined location.

18. The method according to claim 17, wherein the location is determined with a computer aided design system.

19. The method according to claim 17, wherein the location is determined by measuring conditions at the duct intersection.

20. The method according to claim 19, wherein the conditions are selected from the group consisting of temperature, pressure, and velocity.

21. The method according to claim 17, wherein the flow modifier is a contoured duct liner.

22. The method according to claim 17, wherein the flow modifier is at least one turning vane.

23. The method according to claim 17, further comprising gunning refractory material on an inside surface of the duct intersection at the determined location, thereby providing the convex surface.

24. A duct intersection, comprising:
a first duct portion;
a second duct portion extending laterally from a side of the first duct portion; and
a transition portion extending between the first and second duct portions, wherein the transition portion has a length extending along a side of the first duct portion and a depth extending away from the side of the first duct portion, wherein the length is greater than a diameter of the second duct portion.

25. The duct intersection according to claim 24, wherein the length is twice the depth.

26. The duct intersection according to claim 24, wherein the transition portion is flared.

27. The duct intersection according to claim 24, wherein the first duct portion includes an enlarged annular region and the transition portion extends between the enlarged annular region and the second duct portion.

28. The duct intersection according to claim 24, wherein the second duct portion extends laterally from the side of the first duct portion at an angle of less than 90 degrees.

29. The duct intersection according to claim 24, wherein the second duct portion tees into the first duct portion.

30. The duct intersection according to claim 24, further comprising at least one flow modifier having a convex surface disposed inside one of the first and second duct portions.

31. The duct intersection according to claim 30, further comprising at least one turning vane.

32. A method of improving gas flow in an exhaust system including at least one duct intersection, the method comprising:
determining a location of a poor flow zone within the duct intersection; and
injecting a fluid into the duct intersection at the determined location.

We claim:

1. A method of improving gas flow in an exhaust system, the method comprising:
determining a location within a duct intersection having undesirable flow characteristics, wherein the duct intersection includes (i) a first duct portion having a first wall and configured to direct a gas in a first direction, and (ii) a second duct portion having a second wall angled relative to the first wall and configured to direct a gas in a second direction angled relative to the first direction, the first duct portion having a selectively openable end portion that (i) in normal operation, is closed such that gas flow of the exhaust system is through the second duct portion, and (ii) opens based on 4 pressure of the gas; and
providing a flow modifier in the duct intersection at the determined location, the flow modifier being anchored in a fixed position to a portion of the first wall and a portion of the second wall, such that fluid is inhibited from flowing between the flow modifier and both the portion of the first wall and the portion of the second wall, the flow modifier comprising a contoured duct liner including an outermost surface configured to modify the direction of gas flow at the determined location.

2. The method according to claim 1, wherein the location is determined with a computer aided design system.

3. The method according to claim 1, wherein the location is determined by measuring conditions at the duct intersection.

4. The method according to claim 3, wherein the conditions are selected from the group consisting of temperature, pressure, and velocity.

5. The method according to claim 1, wherein providing the flow modifier comprises gunning refractory material at the duct intersection at the determined location, wherein the refractory material comprises the flow modifier.

6. The method of claim 1, wherein the flow modifier has a non-uniform thickness along a dimension of the contoured duct liner.

7. The method of claim 1, wherein the duct intersection is a tee such that the second duct portion extends from an intermediate region of the first duct portion.

8. The method of claim 1, wherein the exhaust system is an exhaust system for a coking facility.

9. The method of claim 1, wherein the conditions include at least one of temperature, pressure, or velocity.

10. A method of improving gas flow in an exhaust system including at least one duct intersection, the method comprising:
determining a location of a poor flow zone within the duct intersection including (i) a first duct having a first wall and configured to direct a gas in a first direction, and (ii) a second duct having a second wall and configured to direct a gas in a second direction angle relative to the first direction, wherein the second wall intersects with and is angled relative to the first wall, wherein the first duct includes a selectively openable end portion that (i) in normal operation, is closed such that gas flow of the exhaust system is through the second duct, and (ii) opens based on a pressure of the gas; and
injecting a fluid at the determined location, thereby forming a flow modifier anchored in a fixed position to a portion of the first wall and a portion of the second wall, such that fluid is inhibited from flowing between the flow modifier and both the portion of the first wall and the portion of the second wall, wherein an outermost surface of the formed flow modifier is configured to modify the direction of fluid flow at the determined location.

11. The method of claim 10, wherein the flow modifier has a non-uniform thickness along a dimension of the flow modifier.

12. The method according to claim 10, wherein the location is determined with a computer aided design system.

13. The method according to claim 10, wherein the location is determined by measuring conditions at the duct intersection.

14. The method according to claim 13, wherein the conditions are selected from the group consisting of temperature, pressure, and velocity.

15. The method according to claim 10, wherein the flow modifier is a contoured duct liner.

16. The method according to claim 10, wherein providing the flow modifier comprises gunning refractory material at the duct intersection at the determined location, wherein the refractory material comprises the flow modifier.

17. The method according to claim 10, wherein the flow modifier comprises refractory material.

18. The method according to claim 10, wherein the outermost surface has a convex shape.

19. The method of claim 10, wherein the conditions include at least one of temperature, pressure, or velocity.

\* \* \* \* \*

UNITED STATES PATENT AND TRADEMARK OFFICE
CERTIFICATE OF CORRECTION

PATENT NO.        : 12,325,828 B2
APPLICATION NO.   : 17/191119
DATED             : June 10, 2025
INVENTOR(S)       : John Francis Quanci et al.

Page 1 of 1

It is certified that error appears in the above-identified patent and that said Letters Patent is hereby corrected as shown below:

On the Title Page

On Page 8, Column 2 (item (56) - Other Publications), Line 55, delete "abestos,"" and insert --asbestos,"-- therefor.
On Page 9, Column 2 (item (56) - Other Publications), Line 16, delete "wasteheat" and insert --waste heat-- therefor.

In the Claims

In Column 12, Claim 1, Line 10, delete "4" and insert --a-- therefor.

Signed and Sealed this
Thirtieth Day of December, 2025

John A. Squires
*Director of the United States Patent and Trademark Office*